US012266462B2

(12) United States Patent
Ishizuka

(10) Patent No.: US 12,266,462 B2
(45) Date of Patent: Apr. 1, 2025

(54) REACTOR AND MULTI-PHASE INTERLEAVE-TYPE DC-DC CONVERTER

(71) Applicant: HONDA MOTOR CO., LTD., Tokyo (JP)

(72) Inventor: Kazuhisa Ishizuka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 856 days.

(21) Appl. No.: 17/289,608

(22) PCT Filed: Oct. 16, 2019

(86) PCT No.: PCT/JP2019/040683
§ 371 (c)(1),
(2) Date: Apr. 28, 2021

(87) PCT Pub. No.: WO2020/090472
PCT Pub. Date: May 7, 2020

(65) Prior Publication Data
US 2021/0375523 A1 Dec. 2, 2021

(30) Foreign Application Priority Data
Nov. 2, 2018 (JP) ................................. 2018-207522

(51) Int. Cl.
H01F 27/28 (2006.01)
H01F 27/02 (2006.01)
(Continued)

(52) U.S. Cl.
CPC ............. H01F 27/28 (2013.01); H01F 27/02 (2013.01); H01F 27/24 (2013.01); H02M 3/158 (2013.01)

(58) Field of Classification Search
CPC ........... H01F 27/28; H01F 27/24; H01F 27/02
(Continued)

(56) References Cited

U.S. PATENT DOCUMENTS 4,858,093 A 8/1989 Sturgeon
9,224,531 B2 * 12/2015 Nussbaum .......... H01F 27/2804
(Continued)

FOREIGN PATENT DOCUMENTS

CN 201498341 U 6/2010
CN 102576600 A 7/2012
(Continued)

OTHER PUBLICATIONS

Nov. 26, 2019, International Search Report issued for related PCT Application No. PCT/JP2019/040683.
(Continued)

Primary Examiner — Mang Tin Bik Lian
Assistant Examiner — Joselito S. Baisa
(74) Attorney, Agent, or Firm — Paratus Law Group, PLLC

(57) ABSTRACT

A reactor includes a first core, a first coil and a second coil. The first and second coils each have terminals a and c, and terminals b and d, and are further wound such that a direction of a magnetic flux generated in the first core when a current flows from the terminal a to the terminal b of the first coil and a direction of a magnetic flux generated in the first core when a current flows from the terminal c to the terminal d of the second coil are opposite to each other. A second core is provided on an outside of the first coil and the second coil, and a leakage magnetic flux, which is generated from one of the first coil and the second coil and is not interlinked to the other coil, passes through the second core and circulates around one of the coils.

8 Claims, 19 Drawing Sheets

(51) Int. Cl.
  *H01F 27/24* (2006.01)
  *H02M 3/158* (2006.01)
(58) Field of Classification Search
  USPC .......................................................... 336/180
  See application file for complete search history.

(56) References Cited

U.S. PATENT DOCUMENTS

| | | | |
|---|---|---|---|
| 2002/0017976 A1* | 2/2002 | Okamoto | H01F 27/027 336/229 |
| 2011/0267848 A1* | 11/2011 | Satake | H01F 27/34 363/21.12 |
| 2012/0206232 A1 | 8/2012 | Yamamoto et al. | |
| 2014/0320249 A1 | 10/2014 | Nobusaka et al. | |
| 2015/0287525 A1 | 10/2015 | Yamada et al. | |
| 2016/0111203 A1 | 4/2016 | Yamamoto | |
| 2016/0300658 A1* | 10/2016 | Wu | H01F 3/14 |
| 2018/0061566 A1* | 3/2018 | Lee | H02P 6/085 |
| 2023/0014195 A1* | 1/2023 | Zhou | H01F 27/022 |

FOREIGN PATENT DOCUMENTS

| | | | | |
|---|---|---|---|---|
| CN | 104247237 A | * | 12/2014 | ............ H01F 27/24 |
| CN | 104769689 A | | 7/2015 | |
| CN | 104885169 A | | 9/2015 | |
| CN | 111415804 B | * | 8/2021 | ............ H01F 27/24 |
| JP | 2011-124242 A | | 6/2011 | |
| JP | 2011-124245 A | | 6/2011 | |
| JP | 2014-127637 A | | 7/2014 | |
| JP | 2014-216511 A | | 11/2014 | |
| JP | 2015023158 A | * | 2/2015 | |
| JP | 2016-066721 A | | 4/2016 | |
| JP | 2017-195684 A | | 10/2017 | |

OTHER PUBLICATIONS

Nov. 26, 2019, International Search Opinion issued for related PCT Application No. PCT/JP2019/040683.
Jun. 25, 2023, Translation of Chinese Office Action issued for related CN Application No. 201980072153.8.
Jun. 10, 2022, Chinese Office Action issued for related CN Application No. 201980072153.8.
Jan. 19, 2023, Chinese Office Action issued for related for CN Application No. 201980072153.8.
Feb. 7, 2024, Translation of German Office Action issued for related DE Application No. 112019005461.9.

* cited by examiner

REACTOR AND MULTI-PHASE INTERLEAVE-TYPE DC-DC CONVERTER

CROSS REFERENCE TO PRIOR APPLICATION

This application is a National Stage Patent Application of PCT International Patent Application No. PCT/JP2019/040683 (filed on Oct. 16, 2019) under 35 U.S.C. § 371, which claims priority to Japanese Patent Application No. 2018-207522 (filed on Nov. 2, 2018), which are all hereby incorporated by reference in their entirety.

TECHNICAL FIELD

The present invention relates to a reactor used in a DC-DC converter for vehicles such as electric cars and hybrid electric vehicles (HEV).

BACKGROUND ART

A reactor is configured by mounting coils around a core. For the purpose of insulating the core from the coils, the entirety or a part of the core is buried inside resin by molding or inserted into a cylindrical resin molded product. A reactor in which a reactor main body including the core and the coils mounted around the core is accommodated in a case made of metal such as aluminum, for reasons such as dustproofing, protection, and heat dissipation, is also known in the related art (for example, refer to Patent Literature 1).

A composite type reactor having two coils is known (for example, refer to Patent Literature 2) in which the directions of the leakage magnetic fluxes of the two coils passing through an outer peripheral portion of an annular core are the same, the leakage magnetic flux around the reactor is strengthened, and the leakage magnetic flux is used for a step-up and step-down operation.

RELATED ART LITERATURE

Patent Literature

Patent Literature 1: JP-A-2016-66721
Patent Literature 2: JP-A-2014-127637

SUMMARY OF THE INVENTION

Problem that the Invention is to Solve

In the above-described composite type reactor, it is necessary to provide a space around the reactor to prevent heat generation or the like in other components around the reactor caused by the leakage magnetic flux, and the space is a factor that hinders the miniaturization of the reactor.

An object of the present invention is to provide a reactor that can be miniaturized and a multi-phase interleave-type DC-DC converter including the reactor.

Means for Solving the Problem

According to an aspect of the present invention, there is provided a reactor which includes a first core, a first coil wound around the first core, and a second coil wound around the first core, and is used for power conversion, in which the first coil and the second coil each have one end portion where an output voltage of a power source is input, and the other end portion electrically connected to an output side where the converted power is output, and are further wound such that a direction of a magnetic flux generated in the first core when a current flows from the one end portion to the other end portion of the first coil and a direction of a magnetic flux generated in the first core when a current flows from the one end portion to the other end portion of the second coil are opposite to each other, a second core provided on an outside of at least one of the first coil and the second coil, is further provided, and a leakage magnetic flux, which is generated from one of the first coil and the second coil by energization and is not interlinked to the other coil, passes through the second core and circulates around one of the coils.

The multi-phase interleave-type DC-DC converter according to the present invention includes the reactor and a switching circuit connected to the other end portion side of the first coil and the second coil.

Advantages of the Invention

According to the present invention, it is possible to provide a reactor that can be miniaturized and a multi-phase interleave-type DC-DC converter including the reactor.

MODE FOR CARRYING OUT THE INVENTION

Hereinafter, embodiments of the present invention will be described with reference to the drawings.

Figure 1:
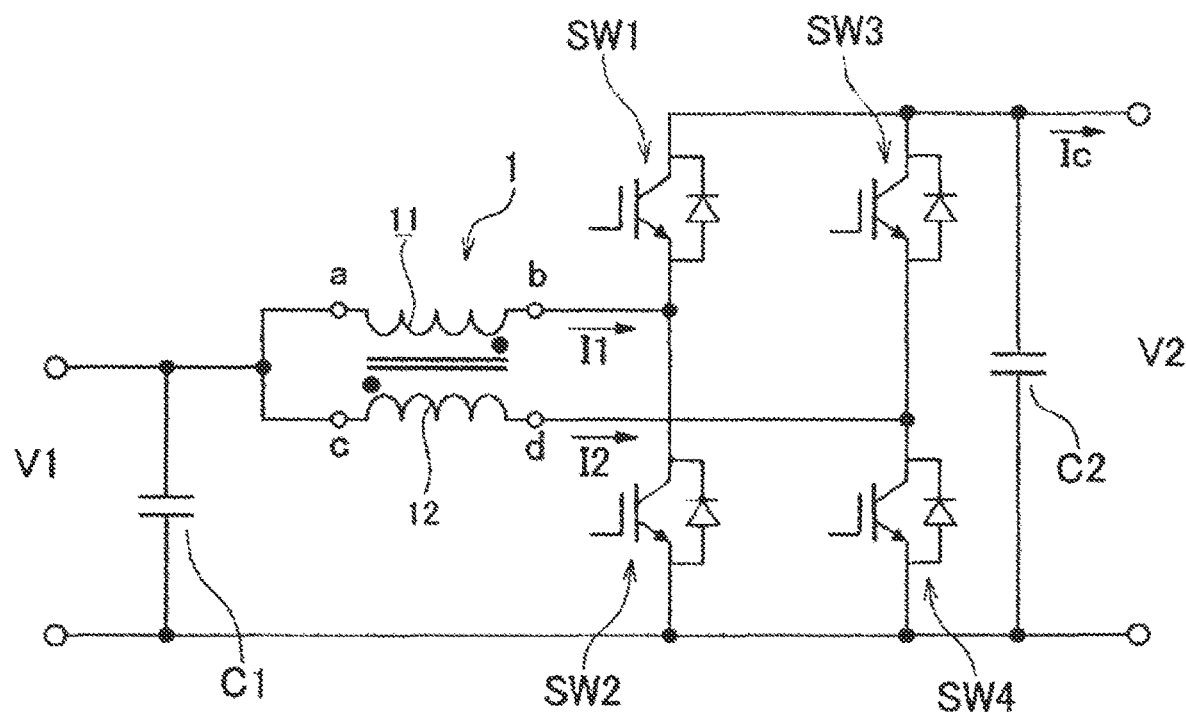
FIG. 1 is a circuit diagram illustrating an example of a two-phase interleave-type DC-DC converter to which a reactor 1 according to an embodiment of the present invention can be applied.

FIG. 1 is a circuit diagram illustrating an example of a two-phase interleave-type DC-DC converter to which a reactor 1 according to an embodiment of the present invention can be applied. The two-phase interleave-type DC-DC converter illustrated in FIG. 1 includes a smoothing capacitor C1, the reactor 1 including a first coil 11 and a second coil 12, switch units SW1, SW2, SW3, and SW4, and a smoothing capacitor C2.

In a case where the DC-DC converter operates with a voltage V1 on the smoothing capacitor C1 side as an input voltage and a voltage V2 on the smoothing capacitor C2 side as an output voltage, the DC-DC converter steps up the input voltage V1. In a case where the DC-DC converter operates with the voltage V2 on the smoothing capacitor C2 side as an input voltage and the voltage V1 on the smoothing capacitor C1 side as an output voltage, the DC-DC converter steps down the input voltage V2.

The switch units SW1 and SW2 are connected to a terminal b of a winding of the first coil 11 of the reactor 1. The switch units SW3 and SW4 are connected to a terminal d of a winding of the second coil 12 of the reactor 1. The switch units SW1, SW2, SW3, and SW4 each include a switching element such as an insulated gate bipolar transistor (IGBT) and a return diode connected in parallel to the switching element.

Each switching element of the switch units SW1 to SW4 is controlled on and off by signals from the switching control unit, which is not illustrated in the drawing. However, when the switching control unit controls the switching element of the switch unit SW1 to be on, the switching control unit controls the switching element of the switch unit SW2 to be off, and conversely, when the switching control unit controls the switching element of the switch unit SW1 to be off, the switching control unit controls the switching element of the switch unit SW2 to be on. Similarly, when the switching control unit controls the switching element of the switch unit SW3 to be on, the switching control unit controls the switching element of the switch unit SW4 to be off, and conversely, when the switching control unit controls the switching element of the switch unit SW3 to be off, the switching control unit controls the switching element of the switch unit SW4 to be on. One cycle (Ts) of the switching control of the switch units SW1 and SW2 and one cycle (Ts) of the switching control of the switch units SW3 and SW4 are out of phase by half a cycle (Ts/2). In other words, the on/off control of the switch unit SW2 and the on/off control of the switch unit SW4 are in a reverse phase relationship with each other.

In the DC-DC converter illustrated in FIG. 1, the first coil 11 and the second coil 12 are magnetically coupled to each other and have a winding ratio of 1:1. Therefore, the same voltage is induced in the second coil 12 as in the first coil 11. The polarity of the first coil 11 and the second coil 12 is indicated by dots. In the configuration illustrated in FIG. 1, a terminal a of the winding of the first coil 11 and a terminal c of the winding of the second coil 12 are connected to the positive side of a power source (Vin). The first coil 11 and the second coil 12 are wound around the core in such a way that the direction of the magnetic flux flowing into the core (the first core 14 described below) around which the first coil 11 is wound is opposite to the direction of the magnetic flux flowing into the core (the first core 14 described below) around which the second coil 12 is wound, in a state where the current flows from the terminal a to the terminal b and the current flows from the terminal c to the terminal d. In other words, the direction of the magnetic flux generated in the core (the first core 14 described below) around which the first coil 11 is wound when a current I1 flows in the first coil 11, is opposite to the direction of the magnetic flux flowing in the core (the first core 14 described below) around which the second coil 12 is wound when a current I2 flows in the second coil 12, and the two magnetic fluxes weaken each other. Meanwhile, when the current I1 flows in the first coil 11 and the current I2 flows in the second coil 12, the directions in which the leakage magnetic fluxes (that is, the magnetic flux generated from one coil and is not interlinked to the other coil, and the magnetic flux that passes through the outside of the core (the first core 14 described below) around which the coil is wound) of each of the first coil 11 and the second coil 12 advance, are the same as each other, and thus, the leakage magnetic fluxes strengthen each other. By using the leakage magnetic flux to accumulate and release magnetic energy in the cupped inductor, the step-up and step-down operation is possible.

In a converter in which the first coil 11 and the second coil 12 are magnetically inversely coupled to each other, the relationship between the primary voltage and secondary voltage is illustrated by the following equation.

$$2V1 - 1\frac{di1}{dt} - (L-M)\frac{di1}{dt} = V2 \qquad \text{[Equation 1]}$$

In the above-described equation, "V1" indicates the primary voltage of the converter, and "V2" indicates the secondary voltage of the converter "i1" indicates the input current of the converter. "L" indicates the self-inductance of each of the first coil 11 and the second coil 12, and "M" indicates the mutual inductance of the first coil 11 and the second coil 12. "l" is the leakage inductance due to the magnetic flux generated from one of the first coil 11 and the second coil 12 and not interlinked to the other coil due to the magnetic flux.

In a case where the leakage magnetic flux is 0 in the above-described equation, both the second term on the left side and the third term on the left side are 0, and voltage conversion cannot be performed. Therefore, the inductance due to the leakage magnetic flux is required, as illustrated in the second term on the left side and the third term on the left side. In other words, in the converter in which the first coil 11 and the second coil 12 are magnetically oppositely coupled to each other, the voltage conversion function is performed using the inductance of the leakage magnetic flux that is generated from one of the first coil 11 and the second coil 12 and circulates around the other coil without being interlinked thereto.

Figure 2:
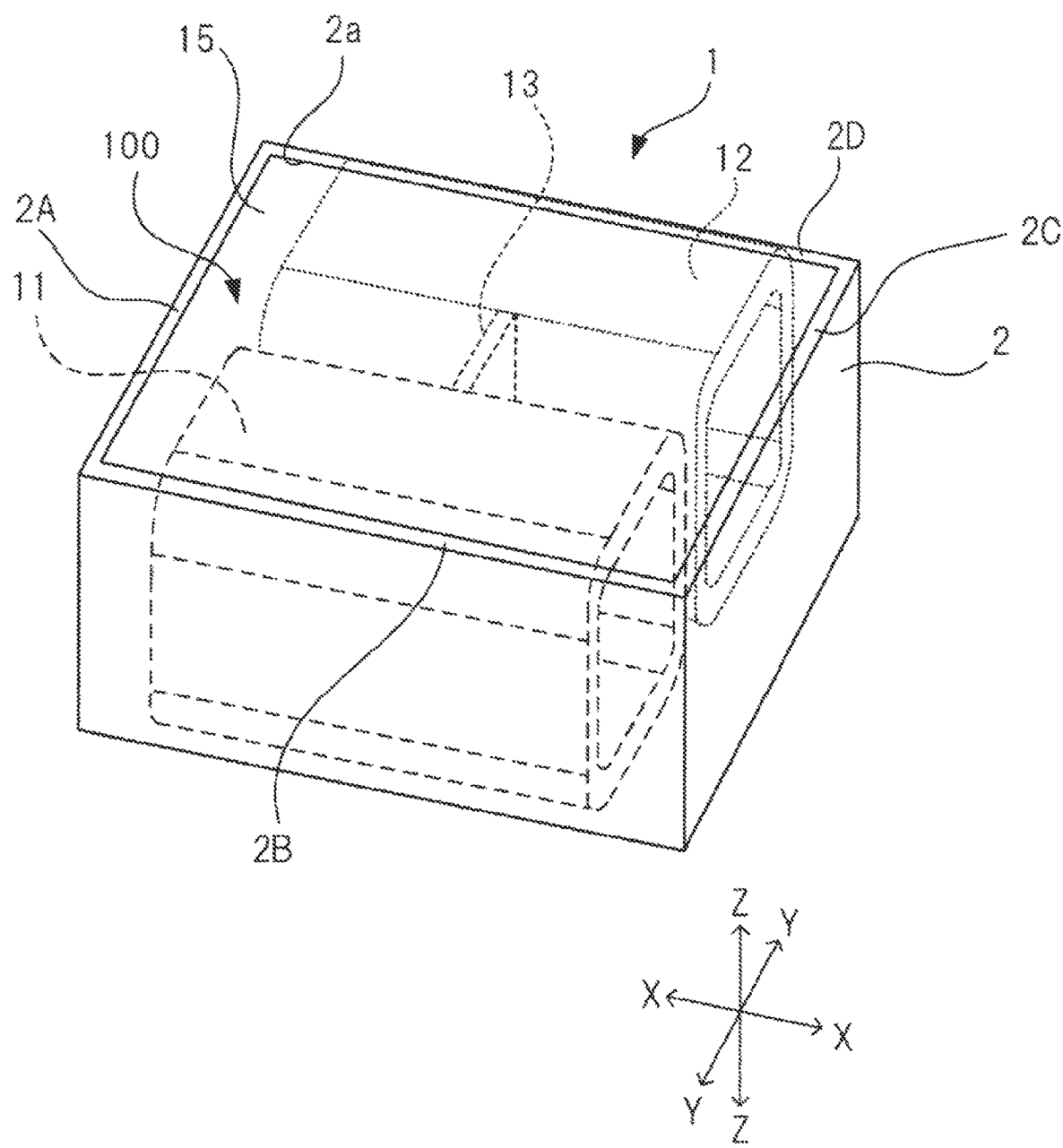
FIG. 2 is a perspective view schematically illustrating a schematic configuration of the reactor 1 according to the embodiment of the present invention.
Figure 3:
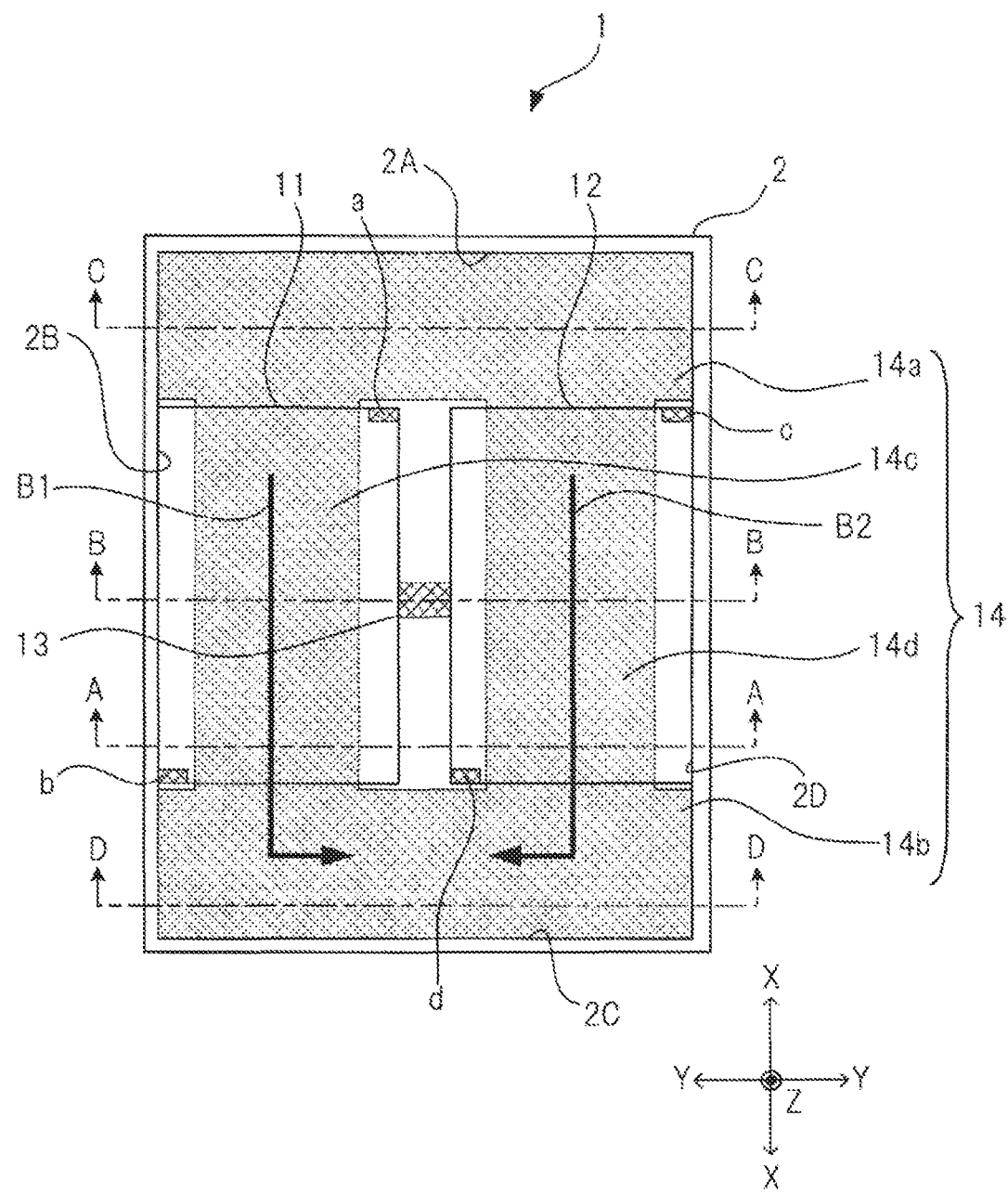
FIG. 3 is a schematic plan view of the reactor 1 illustrated in FIG. 2 when viewed from an opening 2a side in a direction Z.

FIG. 2 is a perspective view schematically illustrating a schematic configuration of the reactor 1 in the DC-DC converter illustrated in FIG. 1. In FIG. 2, some configuration elements (the first core 14 described below) will be omitted. FIG. 3 is a schematic plan view of the reactor 1 illustrated in FIG. 2 when viewed from an opening 2a side in a direction Z. A second core 15, which will be described below, is not illustrated in FIG. 3. The terminals a, b, c, and d illustrated in FIG. 3 are the same as the relationship of the terminals a, b, c, and d illustrated in FIG. 1.

The reactor 1 includes a bottomed cylindrical case 2 with one of the two openings closed in a cylindrical member with a triangular, rectangular, or circular cross-sectional shape. In the example of FIG. 2, the case 2 is configured with one of the two openings closed in a cylindrical member with a rectangular cross-sectional shape.

The case 2 has the opening 2a on one side in the direction Z, and has four sidewalls 2A, 2B, 2C, and 2D having a flat plate shape and parallel to the direction Z. The sidewall 2A and the sidewall 2C are aligned and facing each other in the direction X perpendicular to the direction Z. The sidewall 2B and the sidewall 2D are aligned and facing each other in the direction Y perpendicular to the direction Z and the direction X.

The case 2, for example, is made of metal with high thermal conductivity, houses a reactor main body 100, and has a function as a heat dissipating member for the heat generated from the reactor main body 100. Metals with high thermal conductivity, such as aluminum or magnesium, can be used. The case 2 is not necessarily made of metal, but resin with excellent thermal conductivity or a part of resin with a metal heat sink fixed thereto can also be used.

The reactor main body 100 including the first coil 11, the second coil 12, a spacer 13, and the second core 15, which will be described in detail later, is housed inside the case 2.

The first coil 11 and the second coil 12 are winding coils with the direction X as the axial direction, respectively. The first coil 11 and the second coil 12 are disposed to be aligned while being separated from each other in the direction Y. The configuration of the first coil 11 and the second coil 12 are the same as each other except for the winding direction of the winding. The terminals a, b, c, and d illustrated in FIG. 3 are connected to wires, and the wires are drawn outward from the opening 2a of the case 2 and connected to other circuit elements of the DC-DC converter illustrated in FIG. 1. When the current I1 flows from the terminal a to the terminal b in the first coil 11, a magnetic flux B1 flowing counterclockwise in FIG. 3 is generated in the first core 14. When the current I2 flows from the terminal c to the terminal d in the second coil 12, a magnetic flux B2 flowing clockwise in FIG. 3 is generated in the first core 14. Therefore, the two magnetic fluxes B1 and B2 will be generated in the direction of weakening each other inside the first core 14.

The spacer 13 is a plate-shaped member parallel to the direction Z and extending in the direction Z disposed between the first coil 11 and the second coil 12, and has a function of separating the space between the first coil 11 and the second coil 12 into two in the direction X.

The winding material of each of the first coil 11 and the second coil 12 is configured with various conductors, such as copper. The spacer 13 is made of insulating material, such as resin. The coupling coefficient between the first coil 11 and the second coil 12 is set to a predetermined value smaller than 1 such that the leakage magnetic flux required for the step-up and step-down operation can be obtained. Here, the coupling coefficient between the first coil 11 and the second coil 12 can be set by setting the magnetic permeability of each of the first core 14 and the second core 15, or by setting a gap in a second magnetic path (described later).

Figure 4:
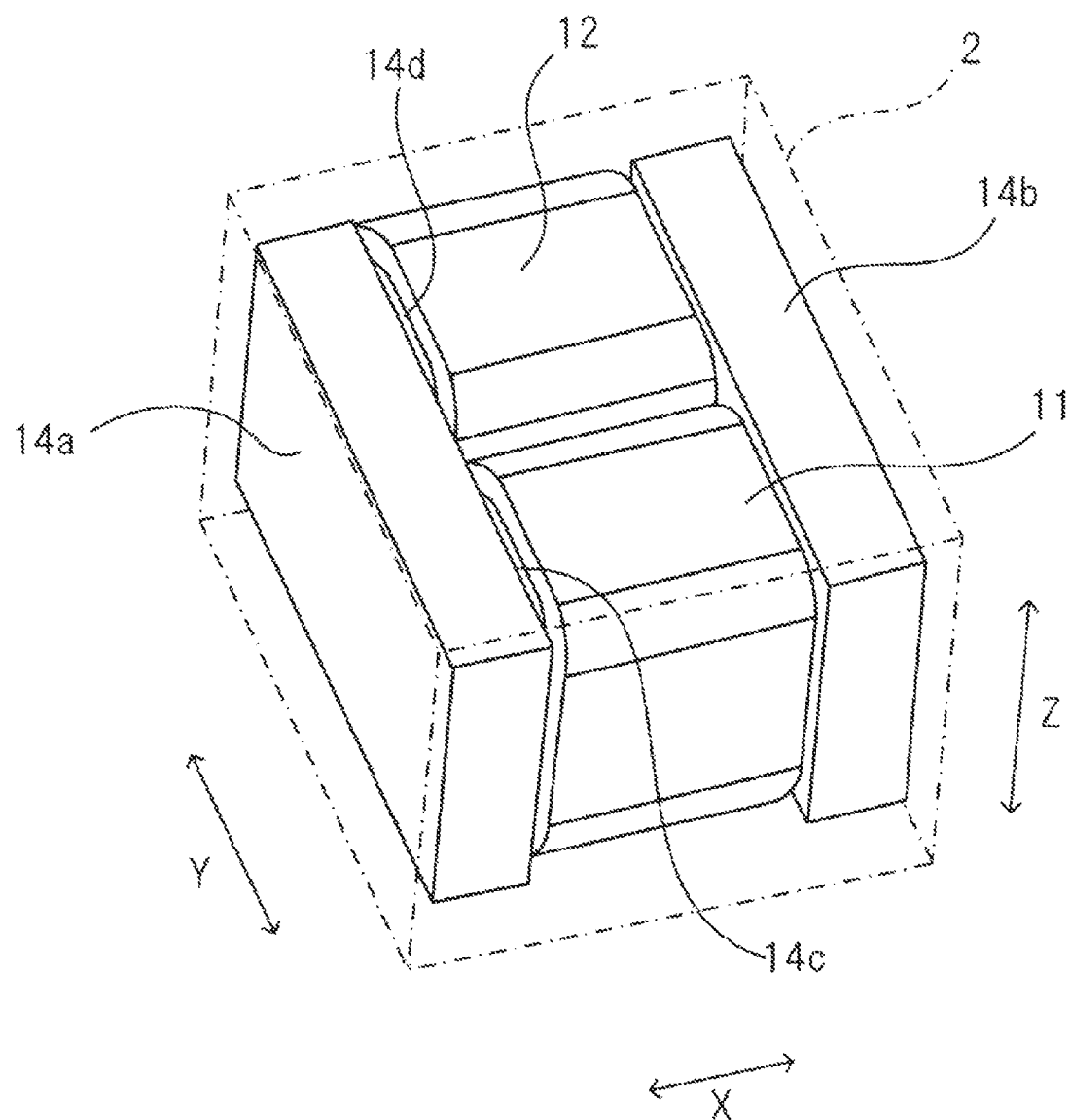
FIG. 4 is a perspective view schematically illustrating an external configuration of a first core 14, a first coil 11, and a second coil 12 in the reactor 1 illustrated in FIG. 3.
Figure 5:
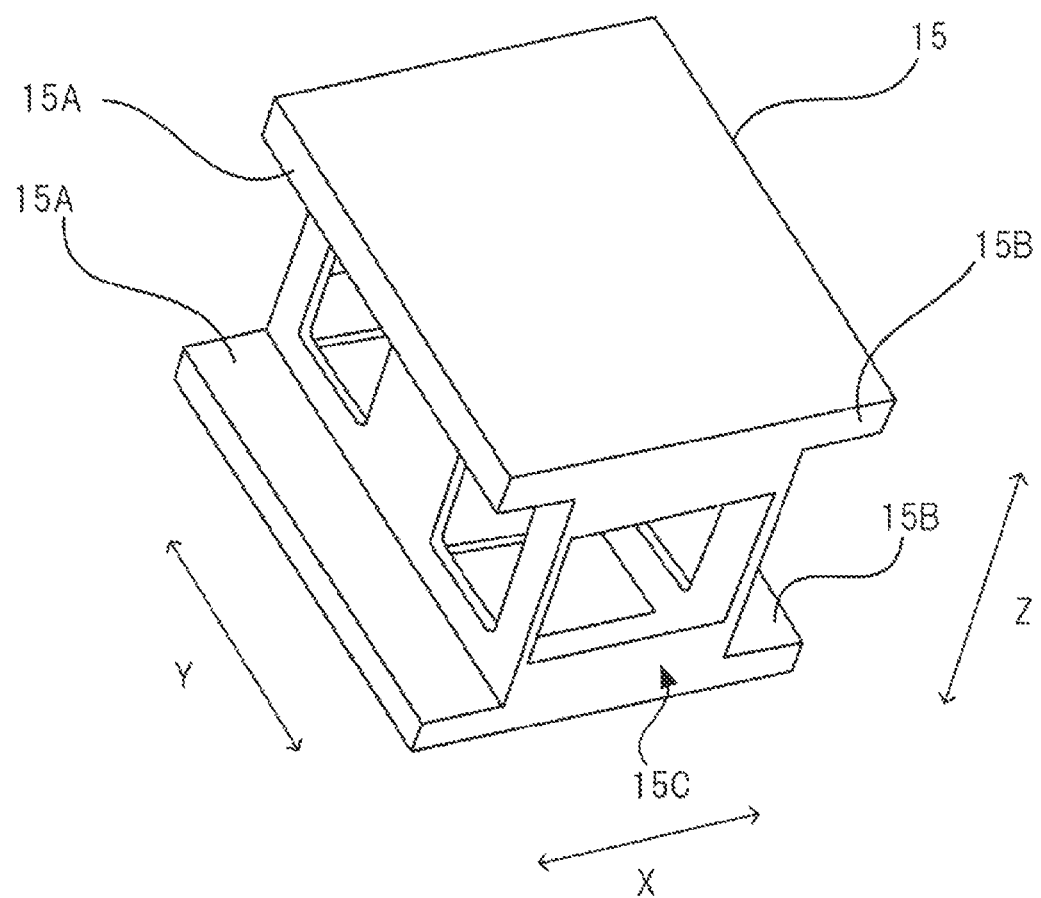
FIG. 5 is a perspective view schematically illustrating the external configuration of a second core 15 in the reactor 1 illustrated in FIG. 2.

FIG. 4 is a perspective view schematically illustrating the external configuration of the first core 14, the first coil 11, and the second coil 12 in the reactor 1 illustrated in FIG. 3. FIG. 5 is a perspective view schematically illustrating the external configuration of the second core 15 in the reactor 1 illustrated in FIG. 2.

Figure 6:
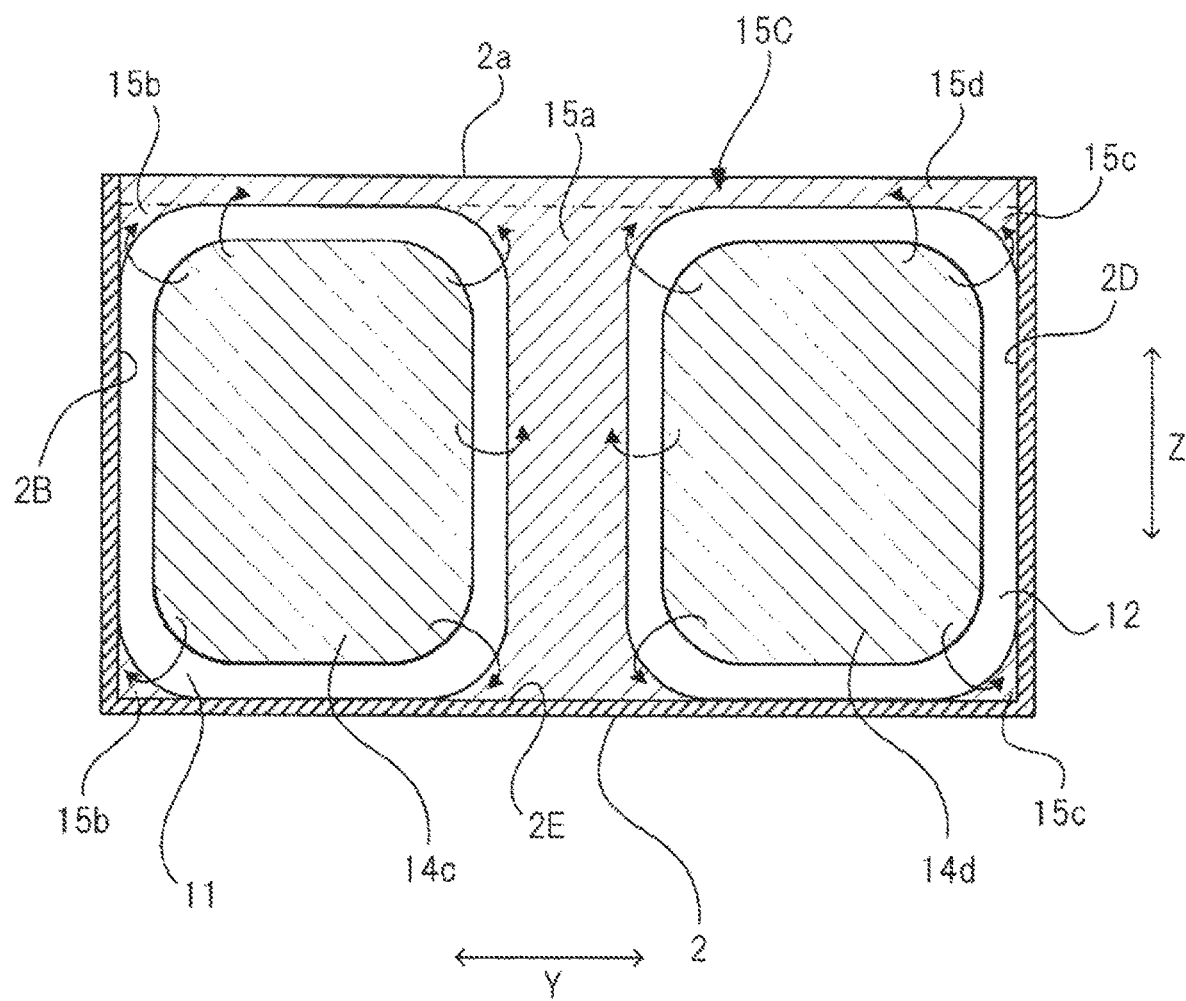
FIG. 6 is a schematic sectional view cut along A-A line in the reactor 1 illustrated in FIG. 3.
Figure 7:
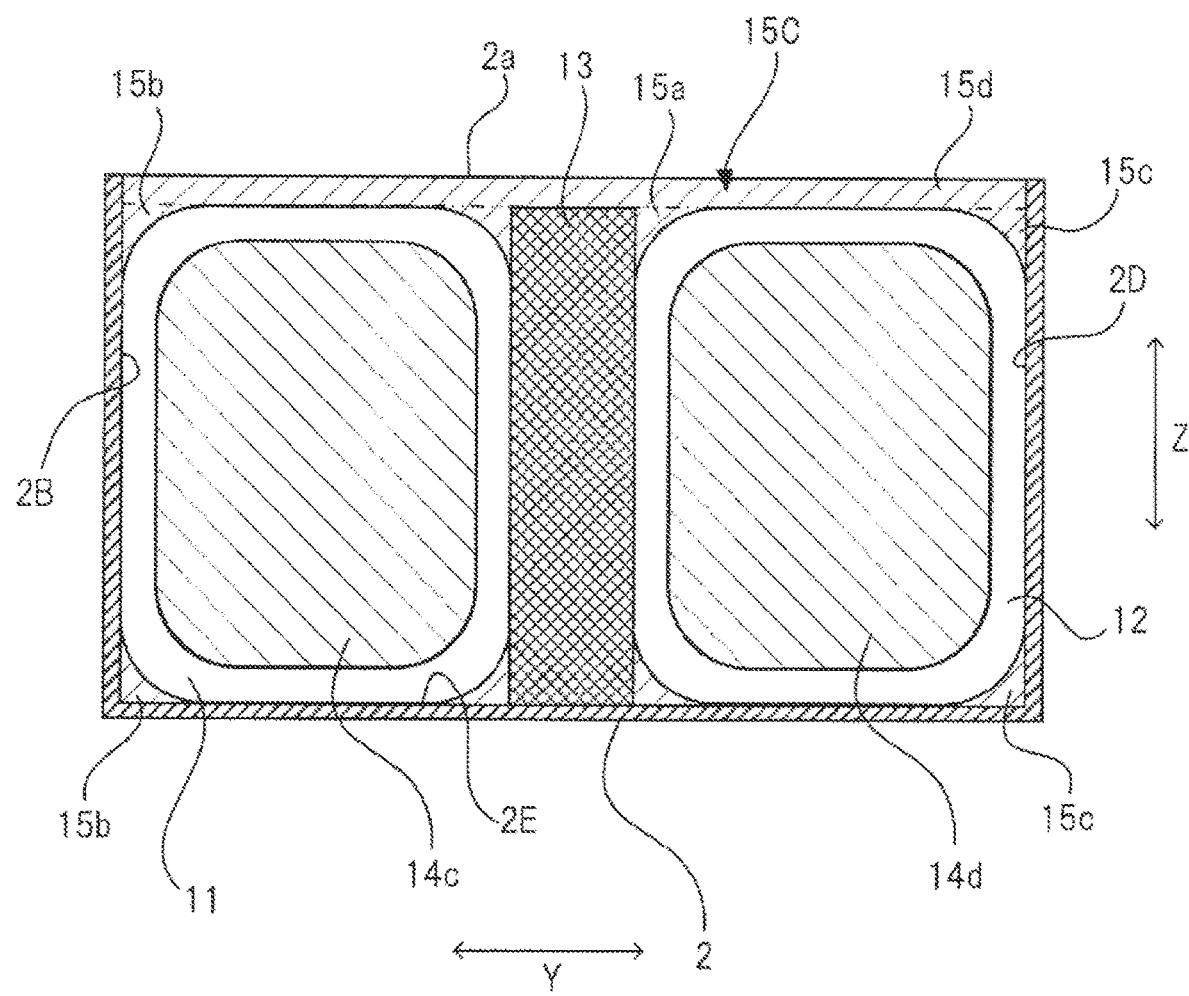
FIG. 7 is a schematic sectional view cut along B-B line in the reactor 1 illustrated in FIG. 3.
Figure 8:
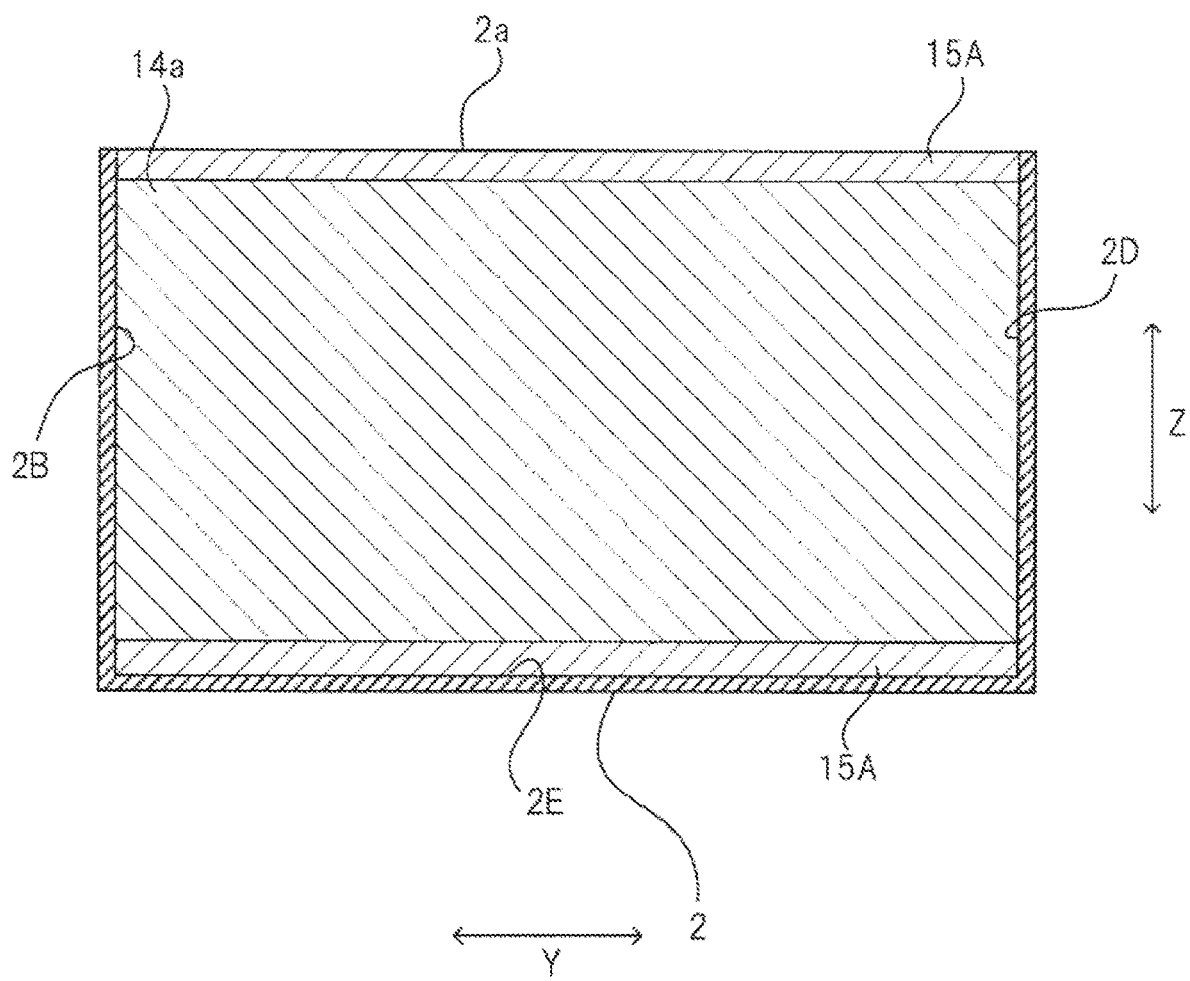
FIG. 8 is a schematic sectional view cut along C-C line in the reactor 1 illustrated in FIG. 3.

FIG. 6 is a schematic sectional view cut along A-A line in the reactor 1 illustrated in FIG. 3. FIG. 7 is a schematic sectional view cut along B-B line in the reactor 1 illustrated in FIG. 3. FIG. 8 is a schematic sectional view cut along C-C line in the reactor 1 illustrated in FIG. 3. The schematic sectional view of the D-D line in the reactor 1 illustrated in FIG. 3 will be omitted because a sign 14a in FIG. 8 is only changed to a sign 14b and a sign 15A in FIG. 8 is only changed to a sign 15B.

As illustrated in FIGS. 3 and 4, the reactor main body 100 housed in the case 2 further includes the first core 14 configured to contain a magnetic material. The first core 14 can be a dust core, a ferrite core, a laminated core made of silicon steel, or a resin core made of molded resin material containing a magnetic material.

The first core 14 includes: the flat plate portion 14a having a flat plate shape which is parallel to the direction Z and extending in the direction Y; the flat plate portion 14b having a flat plate shape which is parallel to the direction Z and extending in the direction Y, and which is separated from the flat plate portion 14a in the direction X; and a rod-shaped wound portion 14c and a wound portion 14d connecting the flat plate portion 14a and the flat plate portion 14b to each other and extending in the direction X, and the entire structure is configured to have a substantially ring shape.

The first coil 11 is wound around the outer peripheral surface of the wound portion 14c of the first core 14. The second coil 12 is wound around the outer peripheral surface of the wound portion 14d of the first core 14. This first core 14 forms a first magnetic path (a passage of the magnetic flux flowing in the order opposite to the order of the flat plate portion 14a, the wound portion 14c, the flat plate portion 14b, the wound portion 14d, and the flat plate portion 14a) that circulates penetrating the first coil 11 and the second coil 12.

As illustrated in FIG. 3, the end surface opposite to the wound portions 14c and 14d in the direction X of the flat plate portion 14a of the first core 14 is in contact with the sidewall 2A of the case 2. Both end surfaces of the flat plate portion 14a of the first core 14 in the direction Y are in contact with the sidewall 2B and the sidewall 2D of the case 2, respectively.

As illustrated in FIG. 3, the end surface opposite to the wound portions 14c and 14d in the direction X of the flat plate portion 14b of the first core 14 is in contact with the sidewall 2C of the case 2. Both end surfaces of the flat plate portion 14b of the first core 14 in the direction Y are in contact with the sidewall 2B and the sidewall 2D of the case 2, respectively.

The first coil 11 and the second coil 12 are edgewise coils, respectively. As illustrated in FIGS. 6 and 7, the first coil 11 and the second coil 12, respectively, are rectangular edgewise coils in which the shape when viewed in the axial direction is a shape in which the four corners of a rectangular frame having two sides parallel to the direction Y and two sides parallel to the direction Z are rounded.

As illustrated in FIGS. 6 and 7, the first coil 11 is fixed inside the case 2 in a state where the end surface opposite to the second coil 12 side in the direction Y is in contact with the sidewall 2B of the case 2 and the end surface opposite to the opening 2a side in the direction Z is in contact with a bottom surface 2E of the case 2.

The second coil 12 is fixed inside the case 2 in a state where the end surface opposite the first coil 11 side in the direction Y is in contact with the sidewall 2D of the case 2 and the end surface opposite the opening 2a side in the direction Z is in contact with the bottom surface 2E of the case 2.

The second core 15 illustrated in FIG. 5 is formed in the housing space of the case 2, except for the part where the first core 14, the first coil 11, the second coil 12, and the spacer 13, which have been described above, are disposed. The second core 15 is made of a resin material that contains a magnetic material, for example. The second core 15 is formed, for example, by pouring the resin material into the case 2 in a state where the first core 14, the first coil 11, the second coil 12, and the spacer 13 are fixed inside the case 2, and later by hardening the resin material.

Specifically, as illustrated in FIGS. 5 to 7, the second core 15 includes: a main body portion 15C formed around the first coil 11 and the second coil 12: a pair of flat plate portions 15A which are provided protruding in the direction X from both ends in the direction Z and one end in the direction X of the main body portion 15C; and a pair of flat plate portions 15B which are provided protruding in the direction X from both ends in the direction Z and the other end in the direction X of the main body portion 15C.

As illustrated in FIGS. 5 and 8, the flat plate portion 15A is a part formed in a state where the space between the flat plate portion 14a of the first core 14 and the opening 2a of the case 2 is buried, and the space between the flat plate portion 14a of the first core 14 and the bottom surface 2E of the case 2 is buried.

As illustrated in FIG. 5, the flat plate portion 15B is a part formed in a state of filling the space between the flat plate portion 14A of the first core 14 and the opening 2A of the case 2, and filling between the flat plate portion 14b of the first core 14 and the bottom surface 2E of the case 2.

As illustrated in FIG. 6, the main body portion 15C of the second core 15 includes: a sub-core portion 15a formed in a state of filling the space between the first coil 11 and the second coil 12; a sub-core portion 15b formed in a state of filling the space between the first coil 11 and the sidewall 2B: a sub-core portion 15c formed in a state of filling the space between the second coil 12 and the sidewall 2D: and a sub-core portion 15d formed in a state of filling the space between the sub-core portion 15a, the sub-core portion 15b, the sub-core portion 15c, the first coil 11, the second coil 12, and the opening 2a of the case 2.

As illustrated in FIG. 7, the spacer 13 is formed between the first coil 11 and the second coil 12, extending from the boundary surface between the sub-core portion 15d and the sub-core portion 15a to the bottom surface 2e of the case 2. With such spacer 13, the sub-core portion 15a of the main body portion 15C is configured to be separated into two parts in the direction X.

In the reactor 1 configured as described above, the magnetic flux generated in the first coil 11 by energizing the first coil 11 flows through the inner peripheral portion of the first coil 11, for example, from the flat plate portion 14a to the flat plate portion 14b, and then flows to the flat plate portion 14a penetrating the inner peripheral portion of the second coil 12 via the flat plate portion 14b, and finally returns to the first coil 11. The magnetic flux generated in the second coil 12 by energizing the second coil 12 flows through the inner peripheral portion of the second coil 12, for example, from the flat plate portion 14a to the flat plate portion 14b, and then flows to the flat plate portion 14a penetrating the inner peripheral portion of the first coil 11 via the flat plate portion 14b, and finally returns to the second coil 12. As such, the first core 14 forms a first magnetic path that circulates penetrating the first coil 11 and the second coil 12 in order, and thus, the first coil 11 and the second coil 12 can be magnetically coupled to obtain the mutual induction action.

A part of the magnetic flux generated by the first coil 11 and the second coil 12 leaks out as the leakage magnetic flux around the first coil 11 and around the second coil 12 instead of the first magnetic path, as illustrated by the curved arrows in FIG. 6. The main body portion 15C of the second core 15 is provided at a part where the leakage magnetic flux passes through. Therefore, the leakage magnetic flux leaked out from one end side of the first coil 11 in the direction X flows through the main body portion 15C to the other end side of the first coil 11 in the direction X and circulates around the first coil 11. Similarly, the leakage magnetic flux leaked out from one end side of the second coil 12 in the direction X flows through the main body portion 15C to the other end side of the second coil 12 in the direction X and circulates around the second coil 12. As such, the second magnetic path is formed by the main body portion 15C, while including a magnetic path that circulates penetrating only the first coil 11 and a magnetic path that circulates penetrating only the second coil 12. Therefore, a self-induction action can be obtained by using the leakage magnetic flux.

Figure 9:
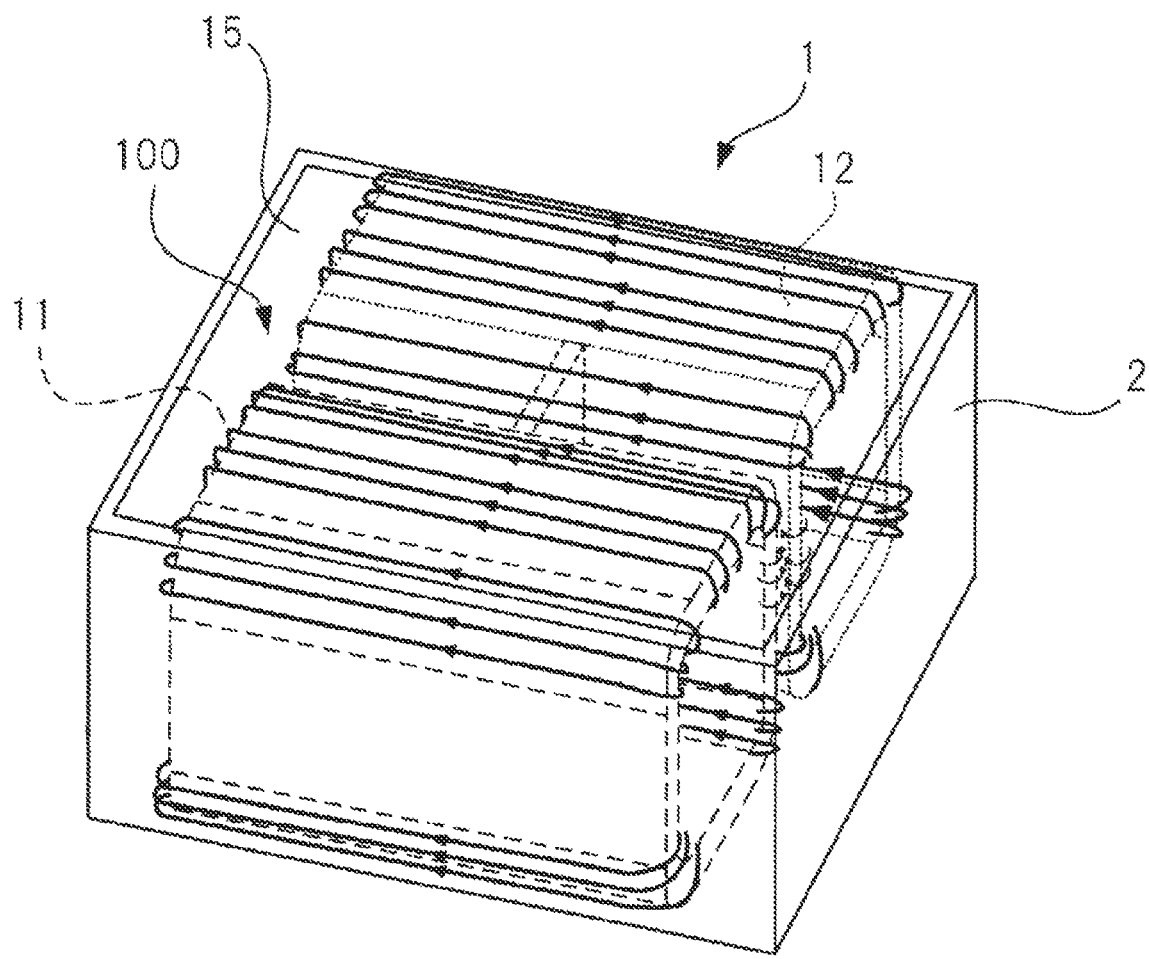
FIG. 9 is a view schematically illustrating a flow of leakage magnetic flux generated by the first coil 11 and the second coil 12.
Figure 9:
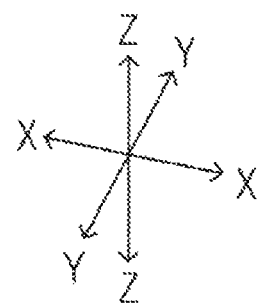

FIG. 9 is a view schematically illustrating the flow of the leakage magnetic flux generated by the first coil 11 and the second coil 12. In a state where the second core 15 does not exist, the leakage magnetic flux from the first coil 11 and the second coil 12 spreads widely around the case 2 and then returns to each coil. Meanwhile, in the reactor 1, as illustrated in FIGS. 6 and 7, the sub-core portion 15b and the sub-core portion 15c exist between the case 2 and the first coil 11 and the second coil 12. In the reactor 1, as illustrated in FIGS. 6 and 7, the sub-core portion 15a exists between the first coil 11 and the second coil 12. Therefore, as illustrated in FIG. 9, most of the leakage magnetic flux from the first coil 11 and the second coil 12 flows to the sub-core portion 15b, the sub-core portion 15c, and the sub-core portion 15a, which have higher magnetic permeability than that in the air. As a result, the spread of the leakage magnetic flux to the surrounding of the case 2 can be prevented, and the increase in space around the case 2 to prevent other members from generating heat can be prevented.

Figure 10:
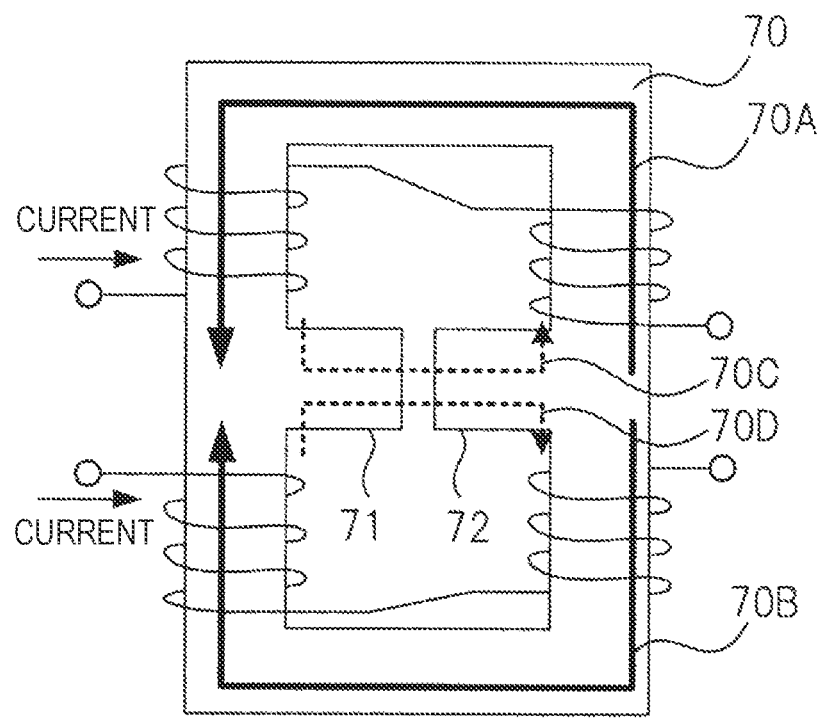
FIG. 10 is a schematic view illustrating a configuration of a composite type reactor of the related art.

FIG. 10 is a schematic view illustrating the configuration of the composite type reactor of the related art. In the composite type reactor having the configuration illustrated in FIG. 10, magnetic fluxes 70A and 70B in opposite directions are generated inside the core 70, and the magnetic fluxes weaken each other. Meanwhile, leakage magnetic fluxes 70C and 70D, which circulate around each of the primary coil and the secondary coil, flow in the same direction between leg portions 71 and 72 which are provided on the core 70. Accordingly, the leakage magnetic flux 70C and the leakage magnetic flux 70D are strengthened. In contrast to the composite type reactor illustrated in FIG. 10, since the reactor 1 according to the present embodiment includes the sub-core portion 15a between the first coil 11 and the second coil 12, and thus, the gap between the first coil 11 and the second coil 12 can be reduced. There is no need for the core to include leg portions as illustrated in FIG. 10. Therefore, it is possible to shorten the magnetic path and improve the inductance.

Figure 11:
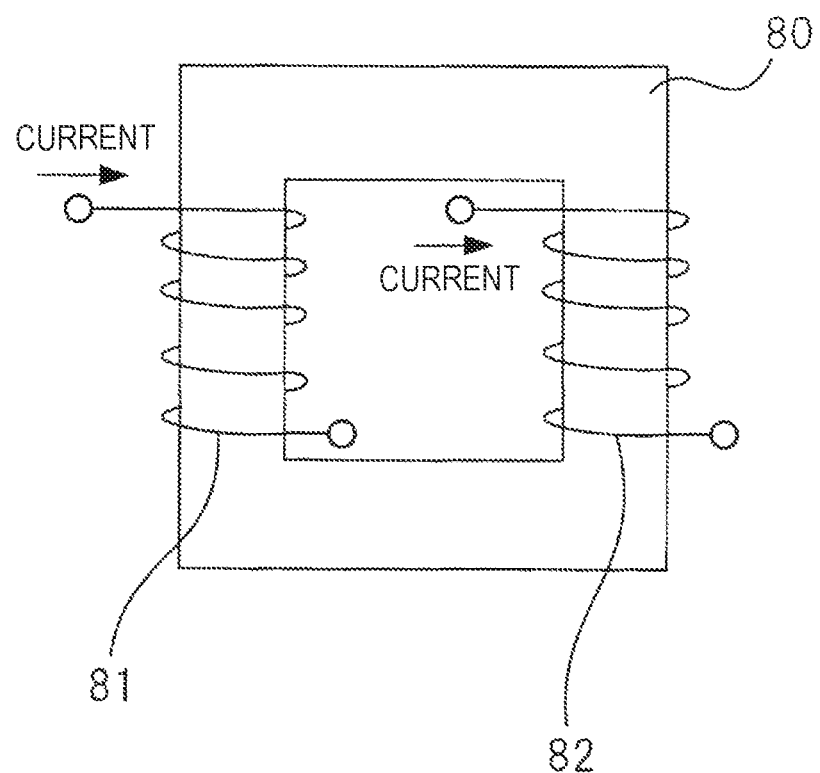
FIG. 11 is a schematic view illustrating a configuration of the composite type reactor of the related art.
Figure 12:
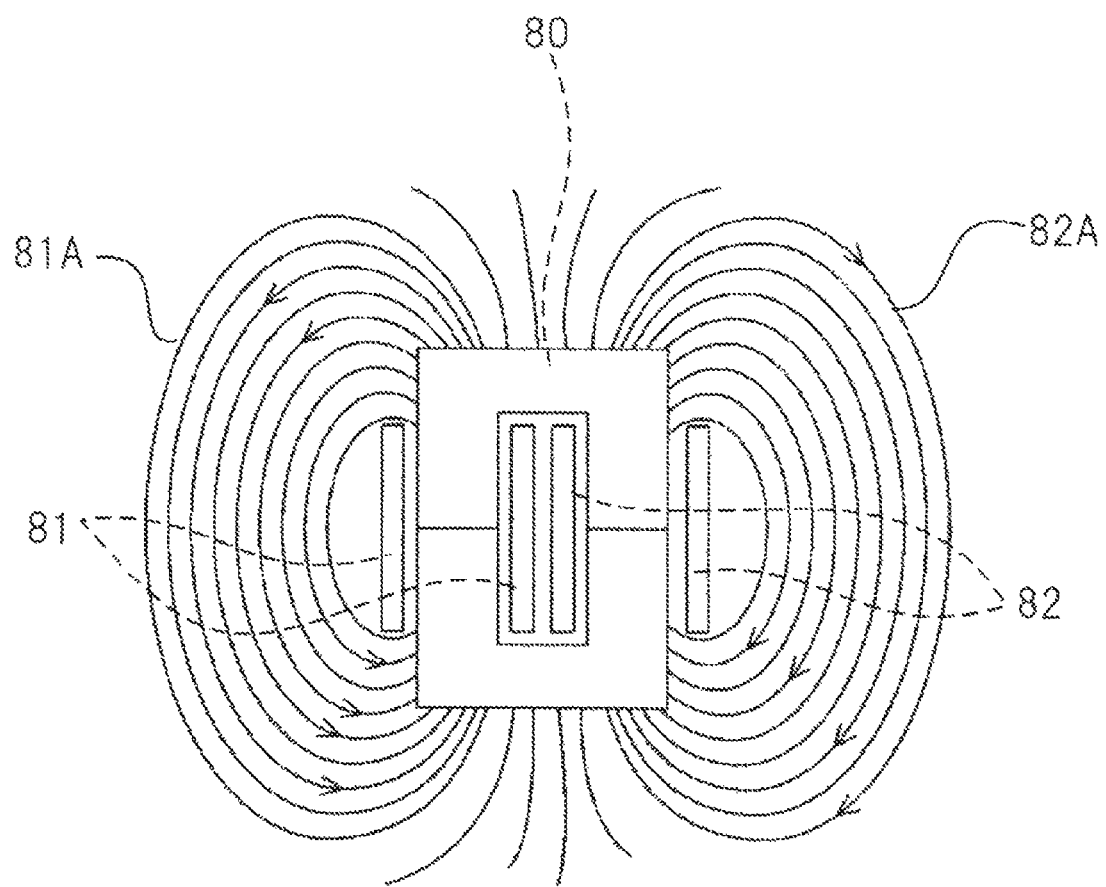
FIG. 12 is a schematic view illustrating magnetic flux distribution of the composite type reactor illustrated in FIG. 11.

FIG. 11 is a schematic view illustrating the configuration of the composite type reactor of the related art. FIG. 12 is a schematic view illustrating magnetic flux distribution of the composite type reactor illustrated in FIG. 11. In the composite type reactor having the configuration illustrated in FIG. 11, the magnetic fluxes in opposite directions are generated inside a core 80, and the magnetic fluxes weaken each other. Meanwhile, leakage magnetic fluxes 81A and 82A, which circulate around each of a primary coil 81 and a secondary coil 82, spread around the core 80 and flows in the same direction. Accordingly, the leakage magnetic flux 81A and the leakage magnetic flux 82A are strengthened. In contrast to the composite type reactor illustrated in FIG. 11, since the reactor 1 according to the present embodiment includes the sub-core portion 15b and the sub-core portion 15c between the first coil 11 and the second coil 12 and the case 2, and thus, as illustrated in FIG. 9, the spread of the leakage magnetic flux of each coil can be prevented.

As such, according to the reactor 1, the leakage magnetic flux of each of the first coil 11 and the second coil 12, which does not pass through the first magnetic path, can be circulated in each of the first coil 11 and the second coil 12 through the second magnetic path. Therefore, the self-inductance of each of the first coil 11 and the second coil 12 can be increased. Accordingly, when the same inductance is to be achieved for the well-known reactor configuration, the number of turns of each of the first coil and the second coil can be reduced, and the first magnetic path can be shortened. The reduction in the number of turns of the first coil 11 and the second coil 12 has the effect of reducing the resistance, and thus, the cross-sectional area of the first core 14 can be reduced. Since the leakage magnetic flux is utilized through the second magnetic path, there is no need for a space around the reactor 1 that considers the heat generated by this leakage magnetic flux. Accordingly, it is possible to achieve both miniaturization and low loss of the reactor 1.

According to the reactor 1, each of the first coil 11 and the second coil 12 is an edgewise coil, and further, each of the first coil 11 and the second coil 12 is disposed in a state of being in contact with the sidewalls 2B and 2D and the bottom surface 2E of the case 2. Therefore, it is possible to use the volume inside the case 2 efficiently, and to miniaturize the reactor 1.

The reactor 1 is configured such that two of the four mutually perpendicular surfaces on the outer peripheral surfaces of each of the first coil 11 and the second coil 12 are in contact with the case 2, and one of the four surfaces faces the opening 2a Therefore, a large cooling area when cooling the first coil 11 and the second coil 12 from outside the case 2 can be obtained, and thus, the cooling efficiency can be increased.

According to the reactor 1, the bottom surface of the case 2 is parallel to the axial direction of each of the first coil 11 and the second coil 12. Therefore, it is possible to easily draw out the terminals of each of the first coil 11 and the second coil 12 from the opening 2a of the case 2, and to reduce the manufacturing cost.

According to the reactor 1, the second core 15 is made of resin containing a magnetic material. Therefore, the second core 15 can be formed by a simple method. Therefore, the manufacturing cost of the reactor 1 can be reduced. The second core 15 can also be made of the same material as the first core 14, although the manufacturing method is more difficult.

According to the reactor 1, the sub-core portion 15a of the main body portion 15C is configured to be separated into two parts in the direction X by the spacer 13. According to such configuration, the inductance can be easily adjusted by the leakage magnetic flux of each of the first coil 11 and the second coil 12, which does not pass through the first magnetic path. Therefore, the reactor 1 can be flexibly designed to meet the required step-up ratio and the like.

In the main body portion 15C, the region where the spacer 13 is formed may be a void where nothing exists. According to the configuration in which the sub-core portion 15a is separated by the spacer 13, it is easy to manufacture, and thus the manufacturing cost can be lowered. The spacer 13 or the void is not required, and the sub-core portion 15a may not be separated in direction X. According to such configuration, the leakage magnetic flux can be used more efficiently.

In the main body portion 15C, the shape of the spacer 13 is not limited to the one illustrated in FIG. 7. For example, in FIG. 7, the spacer 13 may be configured to be formed up to the part of the gap between the spacer 13 and the first coil 11 and the second coil 12 adjacent to each other in the direction Y. According to such configuration, the inductance can be easily adjusted by the leakage magnetic flux of each of the first coil 11 and the second coil 12, which does not pass through the first magnetic path.

In the main body portion 15C, a void or a spacer may be provided separately to separate the sub-core portion 15B or the sub-core portion 15C into a plurality of portions. According to such configuration, the inductance can be easily adjusted by the leakage magnetic flux of each of the first coil 11 and the second coil 12, which does not pass through the first magnetic path.

In the main body portion 15C, one or both of the regions where the sub-core portions 15B and 15C are formed may be a void or a region where the same member as the spacer 13 is provided. Even with such configuration, the leakage magnetic flux from the first coil 11 can be returned to the first coil 11 while preventing the spread of the leakage magnetic flux by the sub-core portion 15a. Similarly, the leakage magnetic flux from the second coil 12 can be returned to the second coil 12 while preventing the spread of the leakage magnetic flux by the sub-core portion 15a. Therefore, it is possible to achieve both miniaturization and low loss of the reactor 1.

In the main body portion 15C, the region where the sub-core portions 15a is formed may be a void or a region where the same member as the spacer 13 is provided. Even with such configuration, the leakage magnetic flux from the first coil 11 can be returned to the first coil 11 while preventing the spread of the leakage magnetic flux by the sub-core portion 15b. Similarly, the leakage magnetic flux from the second coil 12 can be returned to the second coil 12 while preventing the spread of the leakage magnetic flux by the sub-core portion 15c. Therefore, it is possible to achieve both miniaturization and low loss of the reactor 1.

In the main body portion 15C, the region where the sub-core portions 15d is formed may be a void or a region where the same member as the spacer 13 is provided. Even with such configuration, the leakage magnetic flux from the first coil 11 can be returned to the first coil 11 while preventing the spread of the leakage magnetic flux by the sub-core portion 15a. Similarly, the leakage magnetic flux from the second coil 12 can be returned to the second coil 12 while preventing the spread of the leakage magnetic flux by the sub-core portion 15a. The leakage magnetic flux from the first coil 11 can be returned to the first coil 11 while preventing the spread of the leakage magnetic flux by the sub-core portion 15b. Similarly, the leakage magnetic flux from the second coil 12 can be returned to the second coil 12 while preventing the spread of the leakage magnetic flux by the sub-core portion 15c. Therefore, it is possible to achieve both miniaturization and low loss of the reactor 1.

Figure 13:
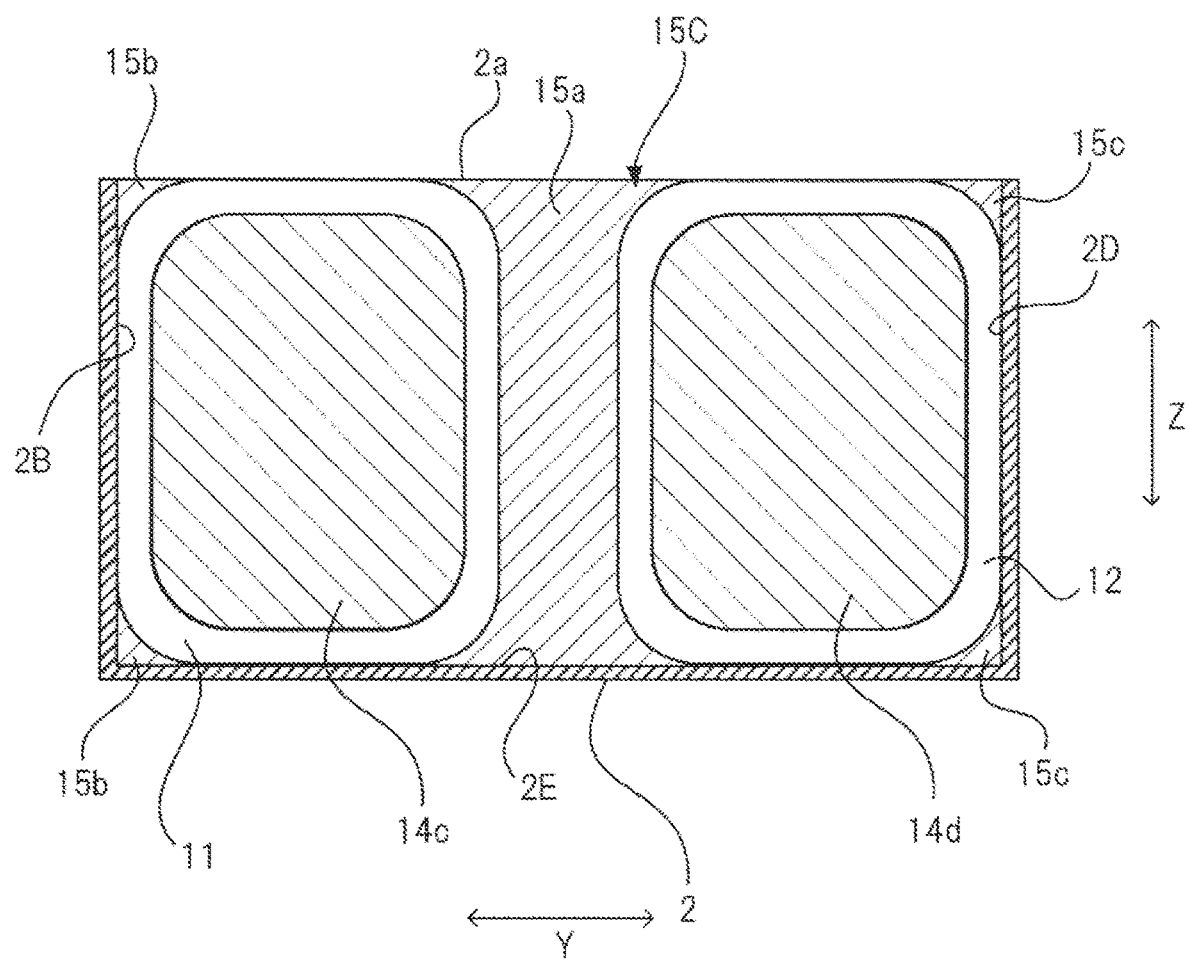
FIG. 13 is a schematic sectional view corresponding to FIG. 5 illustrating a modification example of a main body portion 15C of the second core 15 illustrated in FIG. 4.

In the main body portion 15C illustrated in FIGS. 5 to 7, the sub-core portion 15d is not required and may be deleted. In such configuration, for example, as illustrated in FIG. 13, the end surfaces of the first coil 11 and the second coil 12 opposite to the bottom surface 2E side in the direction Z may be the same position as the opening surface of the opening 2a. Accordingly, it is possible to further miniaturize the reactor 1.

Each of the first coil 1I and the second coil 12 in the reactor 1 are edgewise coils, but may also be circular coils having other shapes, such as an elliptical shape when viewed in direction X.

In the reactor 1, the first core 14 and the second core 15 are separate, but may be integrally formed.

Figure 14:
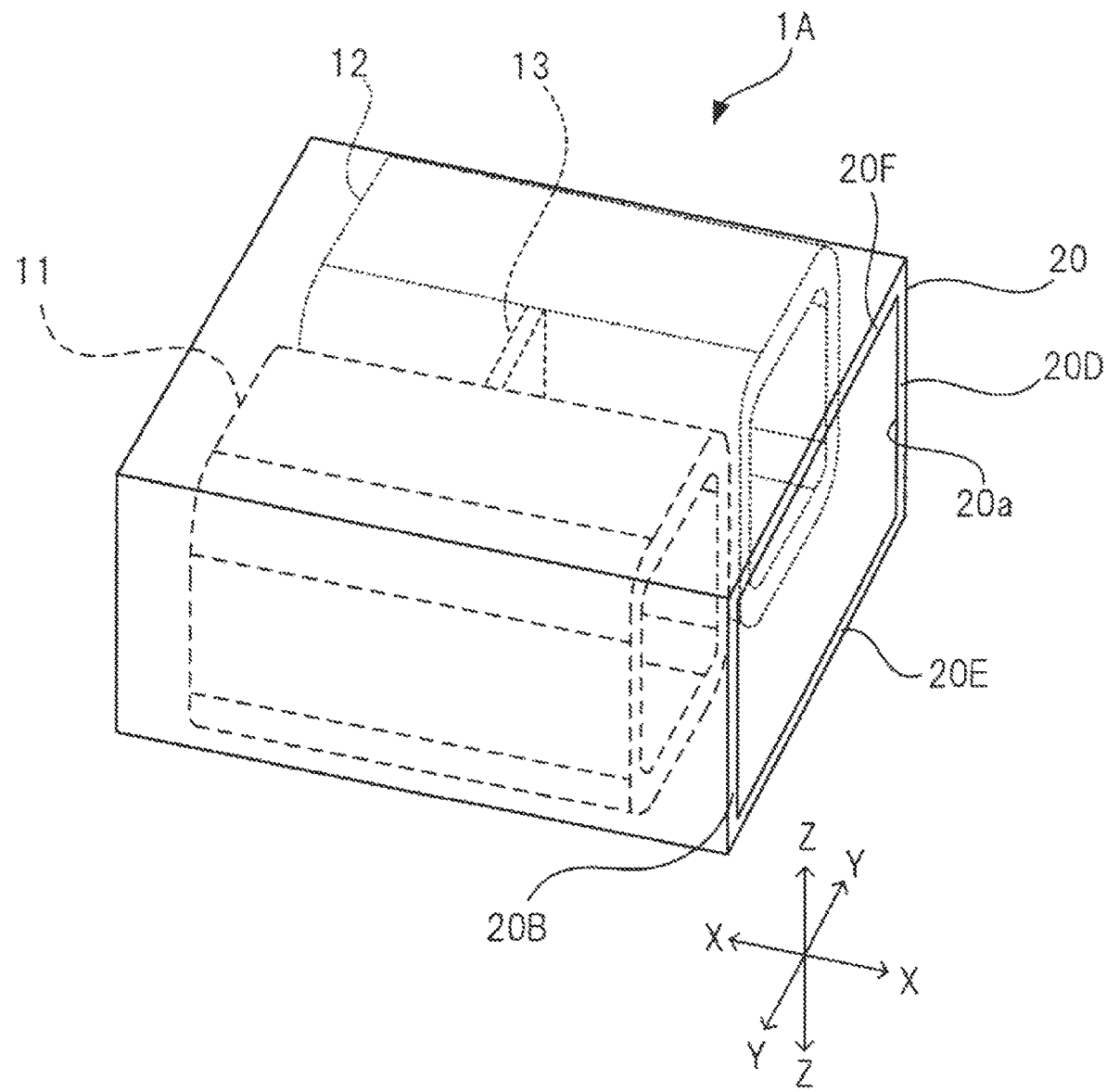
FIG. 14 is an external perspective view schematically illustrating a schematic configuration of a reactor 1A which is a modification example of the reactor 1 illustrated in FIG. 1.

FIG. 14 is an external perspective view schematically illustrating a schematic configuration of a reactor 1A which is a modification example of the reactor 1 illustrated in FIG. 2. The reactor 1A has the same configuration as that of the reactor 1 illustrated in FIG. 2, except that the case 2 is changed to a case 20, and the main body portion 15C of the second core 15 is changed to the configuration illustrated in FIG. 13. In FIG. 14, the same configurations will be given the same reference numerals as those in FIG. 2.

The case 20 of the reactor 1A has the same bottomed cylindrical shape as that of the case 2, but differs from the case 2 in that an opening 20a is formed at one end in direction X.

Specifically, the case 20 has the opening 20a on one side in the direction Z. and has four sidewalls 20A, 20B, 20C, and 20D having a flat plate shape and parallel to the direction X. The sidewalls 20E and 20F are aligned and facing each other in the direction Z. The sidewalls 20B and 20D are aligned and facing each other in the direction Y.

Figure 15:
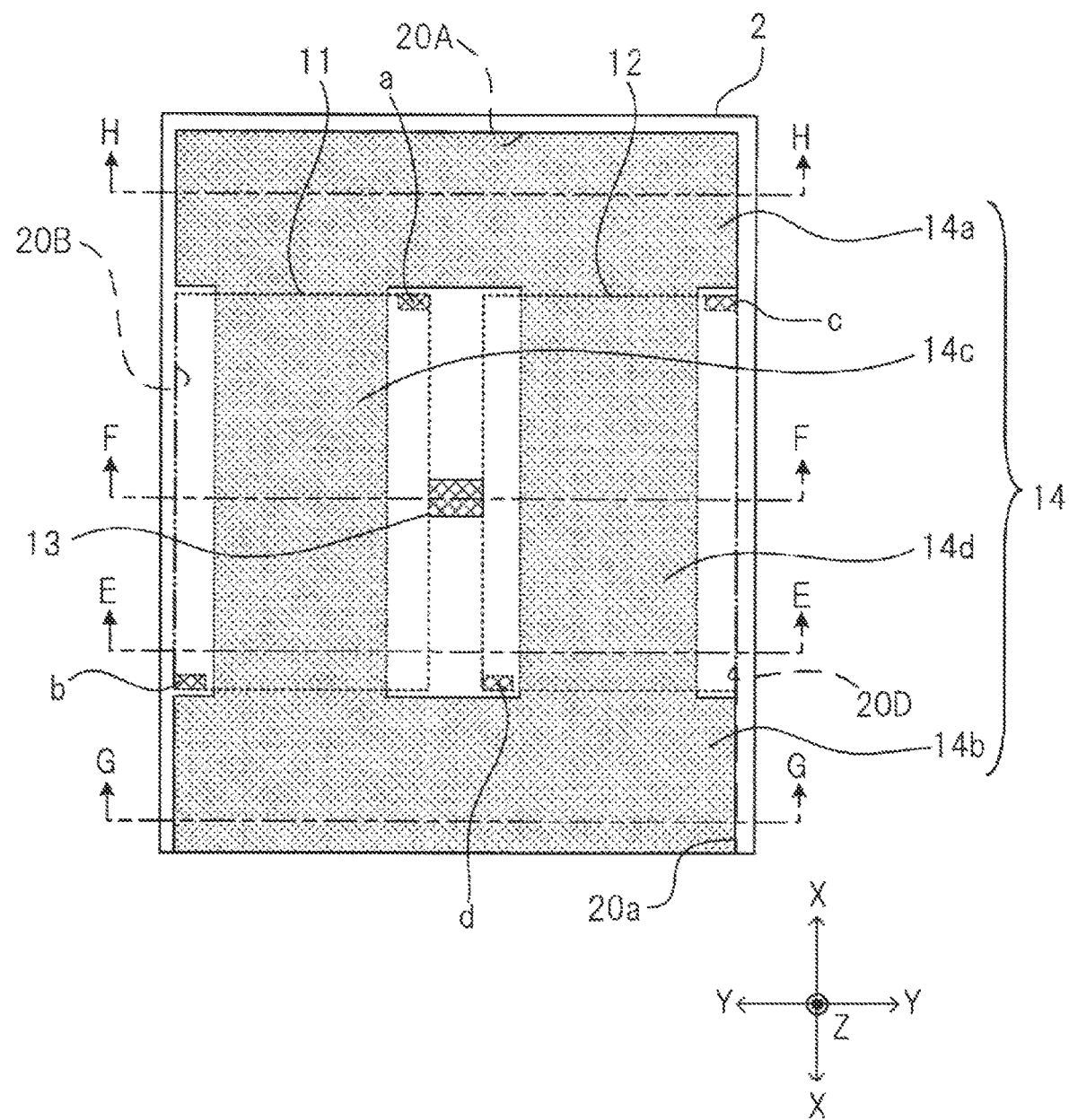
FIG. 15 is a planar schematic view of the reactor 1A illustrated in FIG. 14 when viewed from the direction Z.
Figure 16:
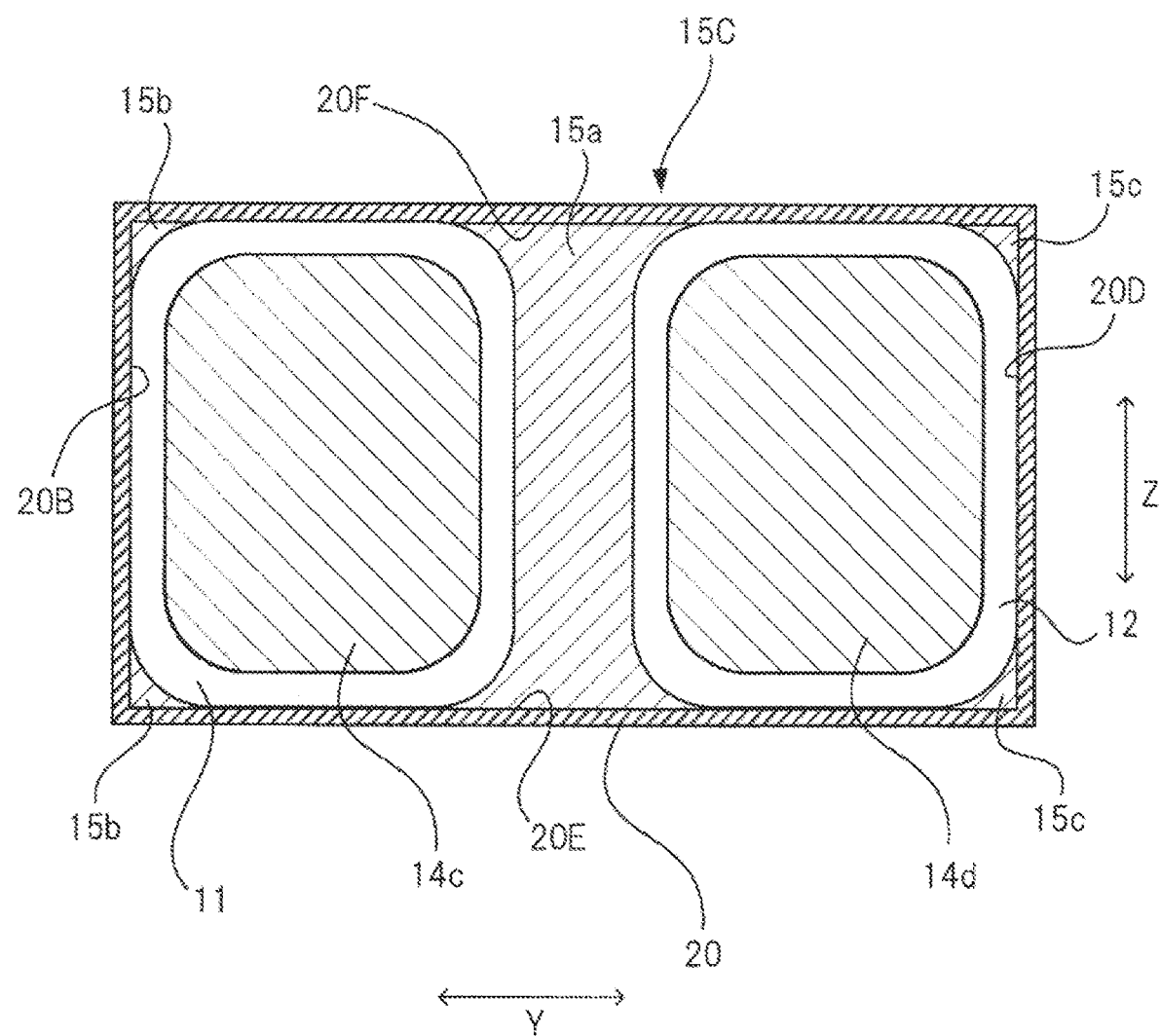
FIG. 16 is a schematic sectional view cut along E-E line in the reactor 1A illustrated in FIG. 15.
Figure 17:
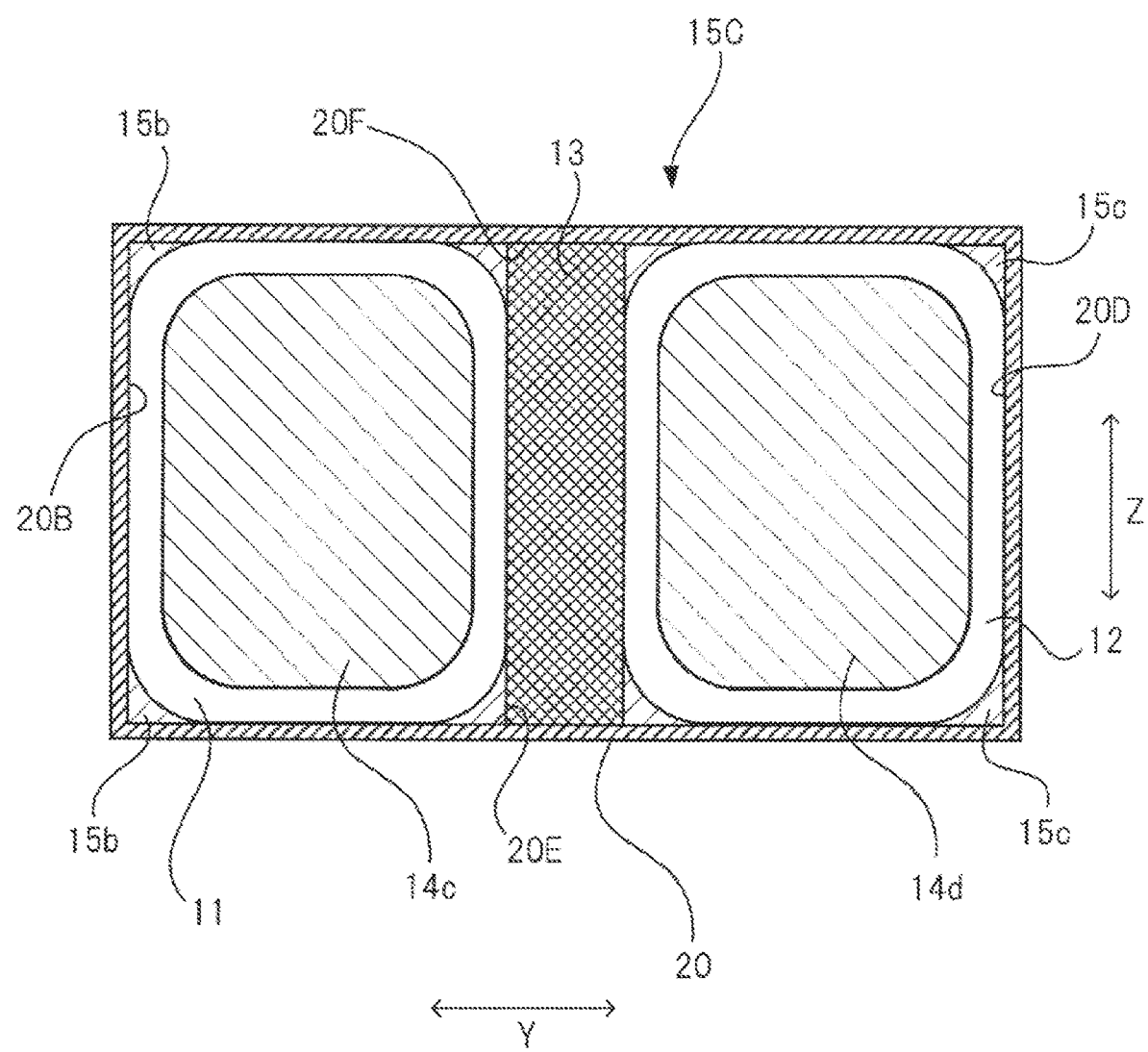
FIG. 17 is a schematic sectional view cut along F-F line in the reactor 1A illustrated in FIG. 15.
Figure 18:
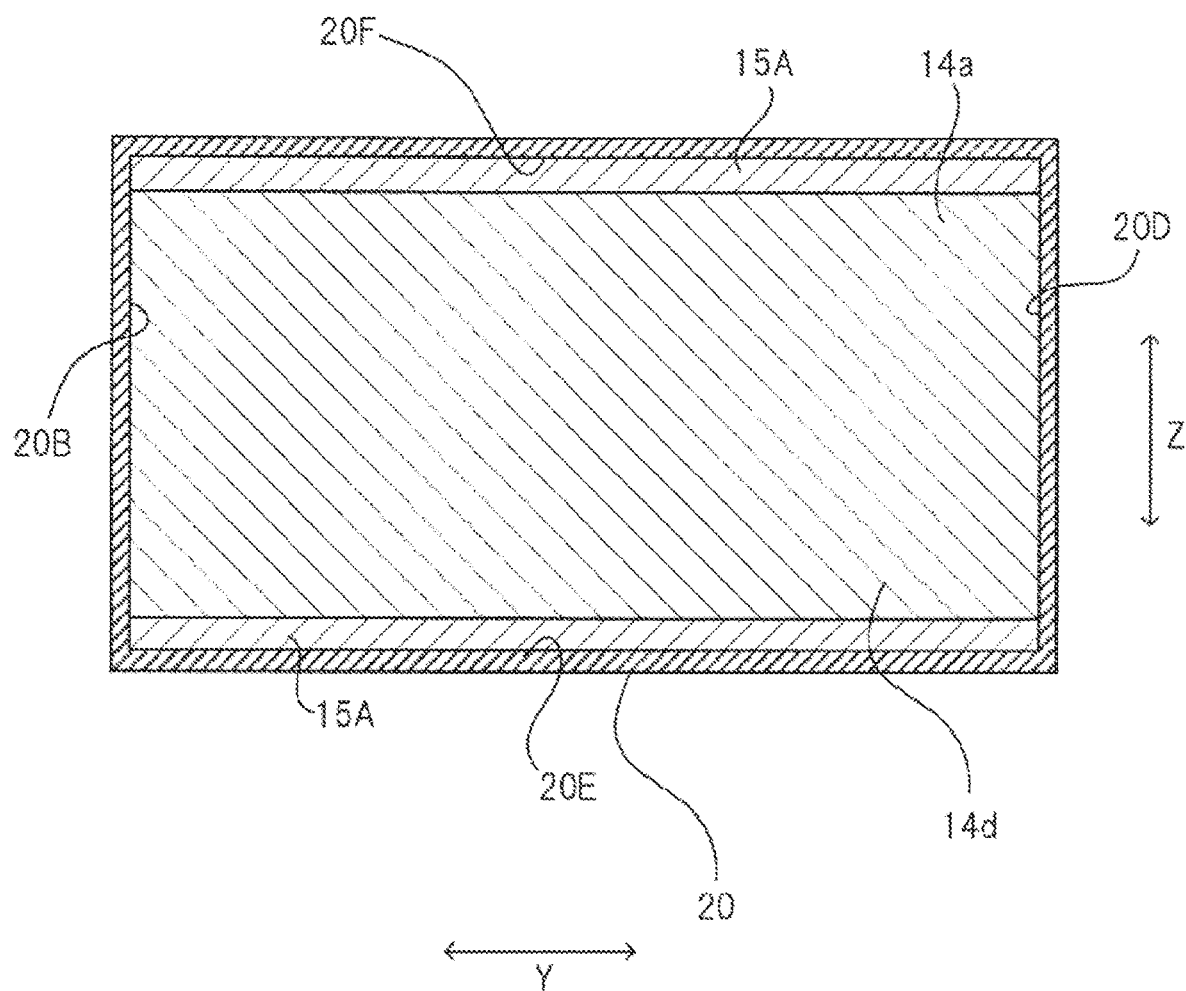
FIG. 18 is a schematic sectional view cut along H-H line in the reactor 1A illustrated in FIG. 15.

FIG. 15 is a planar schematic view of the reactor 1A illustrated in FIG. 14 when viewed from the direction Z. FIG. 16 is a schematic sectional view cut along E-E line in the reactor 1 illustrated in FIG. 15. FIG. 17 is a schematic sectional view cut along F-F line in the reactor 1A illustrated in FIG. 15. FIG. 18 is a schematic sectional view cut along H-H line in the reactor 1A illustrated in FIG. 15. The schematic sectional view of the G-G line in the reactor 1 illustrated in FIG. 15 will be omitted because the sign 14a in FIG. 8 is only changed to the sign 14b and the sign 15A in FIG. 8 is only changed to the sign 15B.

As illustrated in FIG. 15, the end surface opposite to the wound portions 14c and 14d in the direction X of the flat plate portion 14a of the first core 14 is in contact with the bottom surface 20A of the case 20. Both end surfaces of the flat plate portion 14a of the first core 14 in the direction Y are in contact with the sidewall 20B and the sidewall 20D of the case 20, respectively.

The end surface opposite to the wound portions 14c and 14d in the direction X of the flat plate portion 14b of the first core 14 is the same surface as the opening surface of the opening 20a of the case 20. Both end surfaces of the flat plate portion 14b of the first core 14 in the direction Y are in contact with the sidewall 20B and the sidewall 20D of the case 20, respectively.

As illustrated in FIGS. 16 and 17, the first coil 11 is fixed inside the case 20 in a state where the end surface opposite to the second coil 12 side in the direction Y is in contact with the sidewall 2B of the case 20, the end surface on one side in the direction Z is in contact with the sidewall 20F of the case 20, and the end surface on the other side in the direction Z is in contact with the sidewall 20E of the case 20.

The second coil 12 is fixed inside the case 20 in a state where the end surface opposite to the first coil 11 side in the direction Y is in contact with the sidewall 20D of the case 20, the end surface on one side in the direction Z is in contact with the sidewall 20F of the case 20, and the end surface on the other side in the direction Z is in contact with the sidewall 20E of the case 20.

The main body portion 15C of the second core 15 in the reactor 1A includes: the sub-core portion 15a formed between the first coil 11 and the second coil 12: the sub-core portion 15b formed between the first coil 11 and the sidewall 20B, the sidewall 20F, and the sidewall 20E; and the sub-core portion 15c formed between the second coil 12 and the sidewall 20D, the sidewall 20F, and the sidewall 20E. As illustrated in FIG. 17, the sub-core portion 15a in the main body portion 15C of the second core 15 is separated into two parts in the direction X by the spacer 13.

According to the reactor 1A having the above-described configuration, similar to the reactor 1, the same effect as the reactor 1 can be obtained because the second magnetic path described above is formed by the main body portion 15C of the second core 15. According to the reactor 1A, three of the four mutually perpendicular surfaces on the outer peripheral surfaces of each of the first coil 11 and the second coil 12 are in contact with the case 2. Therefore, a large cooling area when cooling the first coil 11 and the second coil 12 from outside the case 2 can be obtained, and thus, the cooling efficiency can be increased.

The reactor 1 and reactor 1A are assumed to include two coils, but the number of coils may be three or more, as in a three-parallel magnetic canceling type transformer used in power conversion circuits described in Japanese Unexamined Patent Application Publication No. 2009-170620. In a reactor including three or more coils, the two adjacent coils among the three or more coils have the same configuration as that of the first coil 11 and second coil 12 described above, and by forming the first core that forms the first magnetic path that circulates penetrating the coils in order, and the second core that forms the second magnetic path that circulates penetrating each of the coils only, it is possible to miniaturize the reactor and reduce losses.

Figure 19:
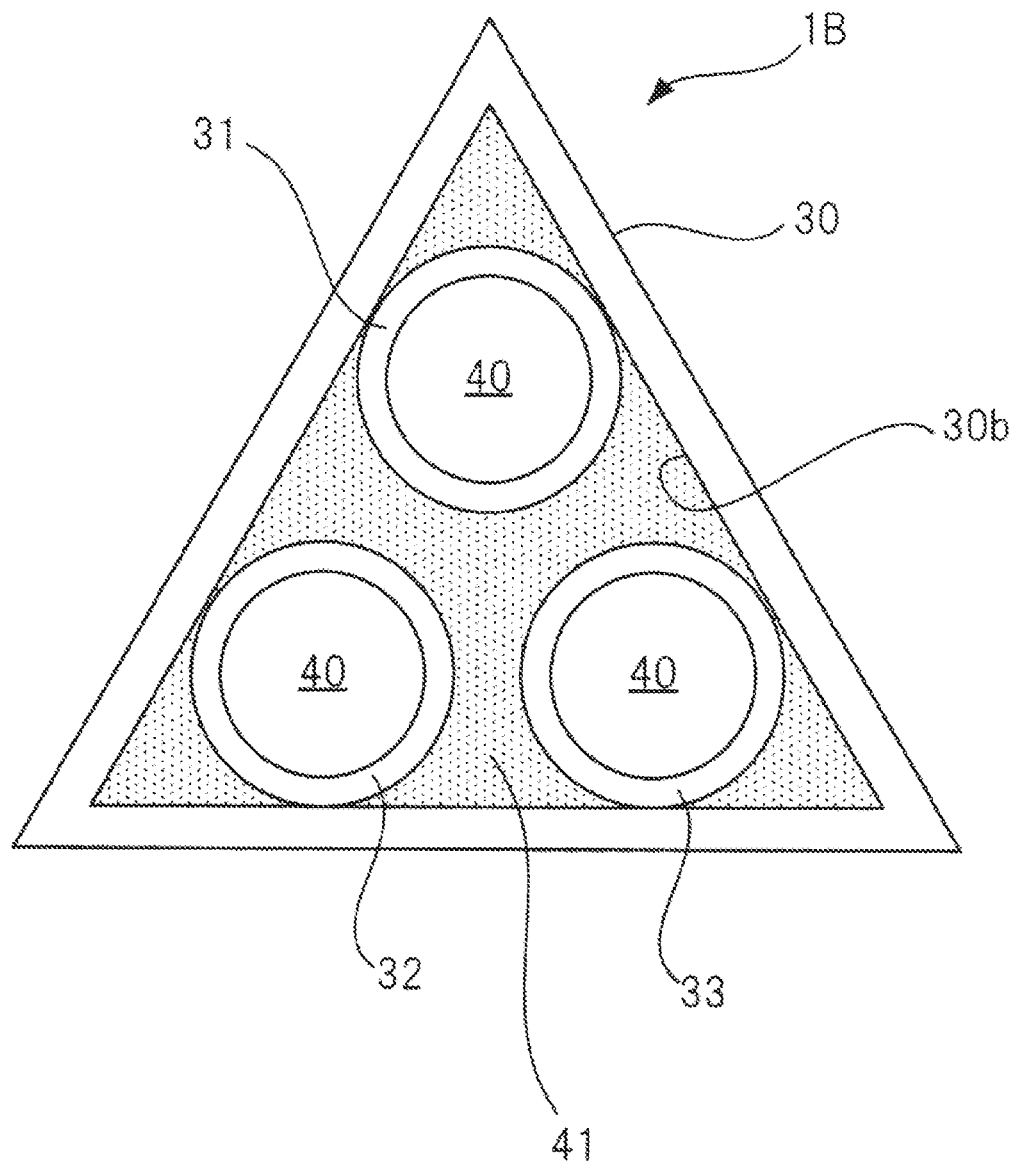
FIG. 19 is a view schematically illustrating a schematic configuration of a reactor 1B which is a modification example of the reactor 1 illustrated in FIG. 2.

FIG. 19 is a view schematically illustrating a schematic configuration of a reactor 1B which is a modification example of the reactor 1 illustrated in FIG. 2. The reactor 1B is a three-parallel magnetic canceling type transformer. Here, the directions of the direct current component of the magnetic flux generated by windings wound in parallel are opposite to each other even when the loop formed by the combination of any two coils is taken, and refer to a model that weakens each other.

The reactor 1B includes: a case 30 of a bottomed cylindrical shape (in the example of FIG. 19, one opening of the cylinder with a triangular cross-sectional outline is closed): coils 31, 32, and 33 housed in the case 30; a first core 40 housed in the case 30 and around which each of the coils 31, 32, and 33 is wound: and a second core 41 formed inside the case 30 in a form that buries the part excluding the coils 31, 32, and 33 and the first core 40. The first core 40 is made of the same material as that of the first core 14, and the second core 41 is made of the same material as that of the second core 15.

The coil 31 and coil 32 are disposed to be separated from each other, the coil 32 and the coil 33 are disposed to be separate from each other, and the coil 33 and the coil 31 are disposed to be separate from each other. A part of the outer peripheral surface of the coil 31 is in contact with two of the three sidewalls 30b of the case 30. A part of the outer peripheral surface of the coil 32 is in contact with two of the three sidewalls 30b of the case 30. A part of the outer peripheral surface of the coil 33 is in contact with two of the three sidewalls 30b of the case 30. The coils 31, 32, and 33 may be disposed at a position which is in contact with each other.

The first core 40 forms a first magnetic path that circulates penetrating the coil 31 and the coil 32 in order, forms a first magnetic path that circulates penetrating the coil 32 and the coil 33 in order, and forms a first magnetic path that circulates penetrating the coil 33 and the coil 31 in order. The magnetic flux directions of the magnetic flux flowing through the first core 40 generated by the coil 31 and the coil 32 are opposite to each other, the magnetic flux directions of the magnetic flux flowing through the first core 40 generated by the coil 32 and the coil 33 are opposite to each other, and the magnetic flux directions of the magnetic flux flowing through the first core 40 generated by the coil 33 and the coil 31 are opposite to each other.

According to the reactor 1B having the above-described configuration, the leakage magnetic flux of each of the coil 31, the coil 32, and the coil 33 can flow to the second core 41 inside the case 30 without spreading around the case 30. Therefore, the same effect as that of the reactors 1 and 1A can be obtained. Similarly to the reactors 1 and 1A, the reactor 1B may have a spacer or a void to separate the second core 41 into a plurality of parts in the axial direction of each coil.

The reactor 1 and the reactor 1A are assumed to have one spacer 13, but the number of spacers 13 may be two or more. Here, the configuration may be such that a plurality of spacers are disposed to be separated from each other in the direction X between the first coil 11 and the second coil 12.

In the present specification, at least the following information is described. In parentheses, the corresponding configuration elements and the like in the above-described embodiments are illustrated, but are not limited thereto.

(1) A reactor (reactor 1) which includes a first core (first core 14), a first coil (first coil 11) wound around the first core, and a second coil (second coil 12) wound around the first core, and is used for power conversion, in which the first coil and the second coil each have one end portion (terminals a and c) where an output voltage of a power source is input, and the other end portion (terminals b and d) electrically connected to an output side where the converted power is output, and are further wound such that a direction of a magnetic flux generated in the first core when a current flows from the one end portion to the other end portion of the first coil and a direction of a magnetic flux generated in the first core when a current flows from the one end portion to the other end portion of the second coil are opposite to each other, a second core (second core 15) provided on an outside of at least one of the first coil and the second coil, is further provided, and a leakage magnetic flux, which is generated from one of the first coil and the second coil by energization and is not interlinked to the other coil, passes through the second core and circulates around one of the coils.

According to (1), the leakage magnetic flux generated from at least one of the first coil and the second coil can be circulated around the coil by the second core. Therefore, the self-inductance due to self-induction of at least one of the first coil and second coil can be increased. Accordingly, when the same inductance is to be achieved for the well-known reactor configuration, the number of turns of the coil can be reduced, and the magnetic path can be shortened. The reduction in the number of turns of the coil has the effect of reducing the resistance of the coil, and thus, the cross-sectional area of the core can be reduced. Since the leakage magnetic flux circulates through the second core, the leakage magnetic flux can be prevented from spreading around the reactor, and there is no need for a large space around the reactor that considers the heat generated by the leakage magnetic flux. Accordingly, it is possible to achieve both miniaturization and low loss of the reactor.

(2) The reactor according to (1), in which the second core has a first sub-core portion (sub-core portions 15b and 15c) formed on an outside of a corner portion of at least one of the first coil and the second coil.

According to (2), the spread of the leakage magnetic flux can be effectively prevented.

(3) The reactor according to (2), further including: a case (case 2) that houses the first coil, the second coil, the first core, and the second core, in which the first sub-core portion is formed between at least one of the first coil and the second coil and the case.

According to (3), the spread of the leakage magnetic flux around the case can be effectively prevented, and the increase of a dead space around the reactor can be prevented.

(4) The reactor according to (3), in which the first coil and the second coil are disposed to be in contact with a bottom surface of the case in a state where an axial direction is parallel to the bottom surface of the case.

According to (4), the outer peripheral surface of one coil comes into contact with the sidewall and the bottom surface of the case, and the outer peripheral surface of the coil also faces the opening. Therefore, a large cooling area when cooling the coil from outside the case can be obtained, and thus, the cooling efficiency can be increased. According to the configuration in (4), the terminals of each coil can be easily drawn out from the opening of the case, and reduce the manufacturing cost.

(5) The reactor according to (3), in which each of the first coil and the second coil is disposed to be in contact with three sidewalls of the case in a state where an axial direction is perpendicular to a bottom surface of the case.

According to (5), one coil comes into contact with the three sidewalls of the case. Therefore, a large cooling area when cooling the coil from outside the case can be obtained, and thus, the cooling efficiency can be increased. According to (5), it is possible to reduce the volume of the first sub-core portion, and to miniaturize the reactor.

(6) The reactor according to any one of (1) to (5), in which the second core has a second sub-core portion (sub-core portion 15a) formed between the first coil and the second coil.

For example, in a case where the first coil and the second coil are housed in the case, the space is required between the first coil and the second coil. According to (6), since the second sub-core portion exists in the space, much of the leakage magnetic flux from the first coil and the second coil can be efficiently circulated around each coil. By adjusting the volume and the like of the second sub-core portion, it is easy to adjust the step-up rate using the leakage magnetic flux, and a flexible design is possible.

(7) The reactor according to (6), in which the second sub-core portion is separated into a plurality of parts in the axial direction of the first coil and the second coil.

According to (7), the reactor can be flexibly designed to meet the required step-up ratio and the like.

(8) The reactor according to (7), in which the second sub-core portion is separated into the plurality of parts by a spacer (spacer 13) disposed between the first coil and the second coil.

According to (8), the second sub-core portion can be easily separated, and the manufacturing cost can be lowered.

(9) The reactor according to any one of (1) to (8), in which the second core is made of a resin material that contains a magnetic material.

According to (9), for example, in a state where the first coil and the second coil and the first core are fixed in the bottomed cylindrical case, it is possible to form the second core by a simple method such as pouring resin containing a magnetic material into the space between the sidewall and the bottom surface of the case and each coil and the first core, and hardening the resin. Therefore, the manufacturing cost of the reactor can be reduced.

(10) The reactor according to any one of (1) to (9), in which each of the first coil and the second coil is an edgewise coil having four sides that are perpendicular to each other in a shape when viewed from the axial direction.

According to (10), for example, the coil can be in contact with the sidewall of the case on a surface, and thus, it is possible to improve the cooling efficiency of the coil. It is possible to increase the efficiency of using the volume inside the case of the reactor, and to miniaturize the reactor.

(11) A multi-phase interleave-type DC-DC converter including: the reactor according to any one of (1) to (10); and a switching circuit (switch units SW1 to SW4) connected to the other end portion side of the first coil and the second coil.

Although preferred embodiments have been described with reference to the drawings, the present invention is not limited to such examples. It is obvious that those skilled in the art can come up with various examples of changes or modifications within the scope of the claims, which are also naturally understood to belong to the technical scope of the present invention. Each configuration element in the above-described embodiment may be combined in any manner within the range that does not depart from the gist of the invention.

The present invention contains subject matter related to Japanese Patent Application No. 2018-207522 filed in the Japanese Patent Office on Nov. 2, 2018, the entire contents of which are incorporated herein by reference.

DESCRIPTION OF REFERENCE NUMERALS AND CHARACTERS

1: reactor
11: first coil
12: second coil
14: first core
14a. 14b: flat plate portion
14c, 14d: wound portion
15: second core
15a: sub-core portion
15b: sub-core portion
15c: sub-core portion
15d: sub-core portion

The invention claimed is:

1. A reactor which includes a first core, a first coil wound around the first core, and a second coil wound around the first core, and is used for power conversion, wherein:
the first coil and the second coil each have one end portion where an output voltage of a power source is input, and an other end portion electrically connected to an output side where the converted power is output, and are further wound such that a direction of a magnetic flux generated in the first core when a current flows from the one end portion to the other end portion of the first coil and a direction of a magnetic flux generated in the first core when a current flows from the one end portion to the other end portion of the second coil are opposite to each other;
a second core provided on an outside of at least one of the first coil and the second coil, is further provided;
a leakage magnetic flux, which is generated from one of the first coil and the second coil by energization and is not interlinked to an other of the first coil and the second coil, passes through the second core and circulates around one of the first and second coils;
the second core has a second sub-core portion formed between the first coil and the second coil;
the second sub-core portion is separated into a plurality of parts in an axial direction of the first coil and the second coil; and
the second sub-core portion is separated into the plurality of parts by a spacer disposed between the first coil and the second coil and extending from the first coil toward the second coil.

2. The reactor according to claim 1, wherein
the second core has a first sub-core portion formed on an outside of a corner portion of at least one of the first coil and the second coil.

3. The reactor according to claim 2, further comprising:
a case that houses the first coil, the second coil, the first core, and the second core, wherein
the first sub-core portion is formed between at least one of the first coil and the second coil and the case.

4. The reactor according to claim 3, wherein
the first coil and the second coil are disposed in a state where an axial direction is parallel to a bottom surface of the case.

5. The reactor according to claim 3, wherein
each of the first coil and the second coil is disposed in a state where an axial direction intersects a bottom surface of the case.

6. The reactor according to claim 1, wherein
the second core is made of a resin material that contains a magnetic material.

7. The reactor according to claim 1, wherein
each of the first coil and the second coil is an edgewise coil having four sides that are perpendicular to each other in a shape when viewed from an axial direction.

8. A multi-phase interleave-type DC-DC converter comprising:
the reactor according to claim 1; and
a switching circuit connected to a side of the other end portion of the first coil and the second coil.

* * * * *